(12) United States Patent
Takahashi et al.

(10) Patent No.: US 10,881,959 B2
(45) Date of Patent: Jan. 5, 2021

(54) STORAGE MEDIUM HAVING STORED THEREIN GAME PROGRAM, GAME APPARATUS, GAME SYSTEM, AND GAME PROCESSING METHOD

(71) Applicant: NINTENDO CO., LTD., Kyoto (JP)

(72) Inventors: Hiroyuki Takahashi, Tokyo (JP);
Shugo Takahashi, Tokyo (JP);
Toshiharu Izuno, Kyoto (JP);
Tomohiro Yamamura, Kyoto (JP);
Tomoyoshi Yamane, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 121 days.

(21) Appl. No.: 16/215,871

(22) Filed: Dec. 11, 2018

(65) Prior Publication Data
US 2019/0201790 A1    Jul. 4, 2019

(30) Foreign Application Priority Data

Dec. 28, 2017    (JP) .................................. 2017-253102

(51) Int. Cl.
*A63F 13/56* (2014.01)
*A63F 13/426* (2014.01)
(Continued)

(52) U.S. Cl.
CPC ............ *A63F 13/56* (2014.09); *A63F 13/426* (2014.09); *A63F 13/428* (2014.09); *A63F 13/44* (2014.09);
(Continued)

(58) Field of Classification Search
CPC .......... A63F 13/56; A63F 13/46; A63F 13/44; A63F 13/426; A63F 13/428; A63F 13/5372
(Continued)

(56) References Cited

U.S. PATENT DOCUMENTS 6,280,323 B1    8/2001  Yamazaki et al.
8,197,314 B2 *  6/2012  Ito ........................ A63F 13/10
                                                    463/4
(Continued)

FOREIGN PATENT DOCUMENTS

EP    2 208 517    7/2010
EP    2 529 808    12/2012
(Continued)

OTHER PUBLICATIONS

Extended European Search Report dated Mar. 4, 2019, issued in EP 18211734 (11 pages).
(Continued)

*Primary Examiner* — Michael A Cuff
(74) *Attorney, Agent, or Firm* — Nixon & Vanderhye, P.C.

(57) ABSTRACT

In a first mode, when a movement operation for a moving body is performed, then based on at least one of the movement operation and an operations performed together with the movement operation, a movement parameter for a moving body object is determined, and in a second mode, based on data indicating a marker-indicated position movement operation, a target position of the moving body object indicated by a marker is changed, and the movement parameter for the moving body object is determined based on the target position. Then, when the movement operation is performed, the moving body object is moved based on the determined movement parameter, and an image of a virtual space is generated.

22 Claims, 17 Drawing Sheets

(51) Int. Cl.
*A63F 13/46* (2014.01)
*A63F 13/812* (2014.01)
*A63F 13/44* (2014.01)
*A63F 13/428* (2014.01)
*A63F 13/5372* (2014.01)

(52) U.S. Cl.
CPC .......... *A63F 13/46* (2014.09); *A63F 13/5372* (2014.09); *A63F 13/812* (2014.09)

(58) Field of Classification Search
USPC .......................................................... 463/33
See application file for complete search history.

(56) References Cited

U.S. PATENT DOCUMENTS

| | | | | |
|---|---|---|---|---|
| 8,447,070 | B1* | 5/2013 | Bozarth | H04N 7/18 382/103 |
| 8,854,433 | B1* | 10/2014 | Rafii | G06F 3/017 348/42 |
| 9,211,475 | B2* | 12/2015 | Miyamoto | A63F 13/06 |
| 9,953,424 | B2* | 4/2018 | Simon Vilar | G06T 7/20 |
| 2003/0022707 | A1* | 1/2003 | Namba | A63F 13/95 463/3 |
| 2005/0255899 | A1 | 11/2005 | Takahashi et al. | |
| 2005/0255900 | A1 | 11/2005 | Takahashi et al. | |
| 2006/0293617 | A1* | 12/2006 | Einav | G06F 3/016 601/33 |
| 2007/0213127 | A1* | 9/2007 | Sato | A63F 13/10 463/36 |
| 2008/0312010 | A1* | 12/2008 | Marty | A63B 69/00 473/447 |
| 2009/0029753 | A1 | 1/2009 | Ito | |
| 2010/0267443 | A1 | 10/2010 | Shimamura et al. | |
| 2014/0066230 | A1* | 3/2014 | Bennett | A63B 61/006 473/462 |
| 2014/0092011 | A1* | 4/2014 | De Foras | G06F 3/017 345/157 |
| 2014/0180451 | A1* | 6/2014 | Marty | G06K 9/00342 700/91 |
| 2016/0050360 | A1* | 2/2016 | Fisher | H04N 5/232 348/207.11 |
| 2016/0166912 | A1* | 6/2016 | Paredes | A63B 24/0021 473/462 |
| 2016/0292881 | A1* | 10/2016 | Bose | G06K 9/00711 |
| 2017/0004358 | A1* | 1/2017 | Bose | G06F 19/3481 |
| 2017/0059871 | A1* | 3/2017 | Hashiba | A63F 13/25 |
| 2018/0160198 | A1* | 6/2018 | Watanabe | H04N 5/76 |
| 2018/0200602 | A1* | 7/2018 | Simon Vilar | G06K 9/3241 |
| 2019/0022492 | A1* | 1/2019 | Takahashi | G06T 19/00 |
| 2019/0070512 | A1* | 3/2019 | Fuller | A63F 13/67 |
| 2019/0134487 | A1* | 5/2019 | Kudirka | G06F 3/147 |
| 2020/0033127 | A1* | 1/2020 | Tsujii | G01C 21/26 |
| 2020/0050833 | A1* | 2/2020 | Ogasawara | G06T 7/00 |

FOREIGN PATENT DOCUMENTS

| | | |
|---|---|---|
| JP | H 10-201948 | 8/1998 |
| JP | 2004-097682 | 4/2004 |
| JP | 2005-318964 | 11/2005 |
| JP | 2005-349174 | 12/2005 |
| JP | 2006-255175 | 9/2006 |

OTHER PUBLICATIONS

Office Action in corresponding Japanese Patent Appln. No. JP 2017-253102 dated Nov. 16, 2020.

* cited by examiner

STORAGE MEDIUM HAVING STORED THEREIN GAME PROGRAM, GAME APPARATUS, GAME SYSTEM, AND GAME PROCESSING METHOD

CROSS REFERENCE TO RELATED APPLICATION

The disclosure of Japanese Patent Application No. 2017-253102, filed on Dec. 28, 2017, is incorporated herein by reference.

FIELD

The technology shown here relates to a storage medium having stored therein a game program, a game apparatus, a game system, and a game processing method for controlling a player object based on an operation input.

BACKGROUND AND SUMMARY

Conventionally, there is a game apparatus in which a predetermined operation is performed in a special mode, whereby a player object performs a predetermined action.

In the game apparatus, however, it is not possible to determine a position in a virtual world as aimed at by a user.

Therefore, it is an object of an exemplary embodiment to provide a storage medium having stored therein a game program, a game apparatus, a game system, and a game processing method for enabling a user to aim at a desired position in a particular mode.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

An exemplary configuration of a non-transitory computer-readable storage medium having stored therein a game program according to the exemplary embodiment is executed by a computer included in an apparatus for performing processing based on an operation of a user. The game program causes the computer to execute: acquiring operation data based on a user operation; based on data indicating a movement operation for a moving body in the operation data, causing a player object to perform an action of moving a moving body object in a direction away from the player object in a virtual space; switching an operation mode to a first mode or a second mode; in the first mode, when the movement operation is performed, then based on at least one of the movement operation and an operation performed together with the movement operation, determining a movement parameter for the moving body object in the virtual space; in the second mode, based on data indicating a marker-indicated position movement operation in the operation data, changing a target position of the moving body object indicated by a marker placed so as to indicate a position in the virtual space and determining the movement parameter for the moving body object based on the target position; when the movement operation is performed, moving the moving body object based on the movement parameter determined in the first mode or the second mode; and generating an image of the virtual space.

Based on the above, in a second mode, it is possible to visually confirm a target position when moving a moving body object. Thus, it is possible to aim at the position to which the moving body object moves.

Further, control may be performed to provide a limit on a continuable time in which the second mode can be continued.

Based on the above, a limit is provided on a continuable time in which the second mode can be continued. Thus, a strategy for using the second mode is necessary. Thus, new interest is added to a game.

Further, when the second mode is continued, the continuable time may be decreased in a gradually decreasing manner, and when the continuable time satisfies a switching condition, the operation mode may be switched to the first mode.

Based on the above, when the second mode is used, the time in which the second mode can be continued continues to decrease. Thus, a strategy for preventing the decrease in the time in which the second mode can be continued is necessary. Thus, new interest is added to the game.

Further, when a continuable time change condition is satisfied in the first mode, the continuable time may be increased.

Based on the above, it is possible to provide an unconventional game element in which play in a first mode influences the second mode.

Further, when the player object performs a first action in the first mode, it may be determined that the continuable time change condition is satisfied.

Based on the above, an action of a player object in the first mode influences the second mode. Thus, new interest is added also in the first mode.

Further, in the generation of the image, an image indicating the continuable time set at a current moment may be generated, and the image may be placed near the marker in the second mode.

Based on the above, it is easy for a user to recognize the time in which the second mode continues, while viewing a marker.

Further, in the movement of the moving body object, control may be performed to represent the movement of the moving body object as slower in the second mode than in the first mode.

Based on the above, it is possible to secure the time for executing an operation in the second mode.

Further, the game program may further cause the computer to execute controlling an action of an opponent object that is placed facing the player object in the virtual space and competes against the player object.

Based on the above, it is possible to achieve a game where a player object and an opponent object compete against each other by moving the moving body object in a virtual space where the opponent object is placed.

Further, each of the player object and the opponent object may move the moving body object using a body or a piece of equipment of each of the player object and the opponent object. The game program may further cause the computer to execute, when the moving body object moving based on the movement parameter determined in the second mode collides with the body or the piece of equipment of the opponent object, changing a use limit parameter for the body or the equipment so as to come close to a use limit, and when the use limit parameter reaches the use limit, prohibiting the body or the piece of equipment of the opponent object from being used.

Based on the above, it is necessary to perform a game also taking into account the body of an object or the use limit on a piece of equipment used by the object. Thus, a new game strategy using the second mode is also possible.

Further, in the setting of the use limit, when the moving body object moving based on the movement parameter determined in the first mode collides with the body or the piece of equipment of the opponent object, the use limit parameter may be changed so as to come close to the use limit.

Based on the above, it is necessary to perform the game also taking into account the body of an object or the use limit on a piece of equipment used by the object also in the first mode. Thus, a new game strategy is also possible in the first mode.

Further, in the setting of the use limit, the use limit parameter may be set at any of a plurality of stages. In the generation of the image, an image indicating a stage of the use limit parameter set at a current moment may be generated.

Based on the above, a user can recognize the state of the use limit.

Further, the game program may further cause the computer to execute determining winning or losing of a competition in the virtual space between the player object and the opponent object based on a rule of a sport. In the determination of the winning or losing, when the body or the piece of equipment of the opponent object is prohibited from being used, it may be determined that the opponent object loses the competition.

Based on the above, it is possible to provide a new rule in addition to the rule of a normal sport.

Further, when the moving body object is moved based on the movement parameter determined in the second mode, the moving body object may be caused to reach the target position in the virtual space.

Based on the above, in the second mode, it is possible to aim at the position to which the moving body object is moved in a pinpoint manner.

Further, when the moving body object is moved based on the movement parameter determined in the second mode, the moving body object may be moved using a moving direction and/or a moving velocity calculated based on the target position in the virtual space.

Based on the above, in a first mode, it is possible to achieve a game where it is difficult to aim at the position to which the moving body object is moved.

Further, a range where the target position can be set may be set to be greater than a range in the virtual space where the moving body object can move based on the movement parameter determined in the first mode.

Based on the above, in the second mode, it is possible to move the moving body object using a wide range as a target. Thus, it is possible to use a strategy that is not possible in a first mode.

Further, in the acquisition of the operation data, operation data corresponding to at least one of an operation of pressing an operation button, an operation of tilting an operation stick, an operation of pushing in the operation stick, an operation of touching an operation surface, and an operation based on an orientation or a motion of an input device may be acquired. Based on the operation data corresponding to the at least one operation acquired in the acquisition of the operation data, a position of the target position indicated by the marker in the virtual space may be changed.

Based on the above, it is possible to achieve a marker-indicated position movement operation by various operations.

Further, in the switching of the operation mode, when a switching operation is performed in the first mode, the operation mode may be switched to the second mode.

Based on the above, it is possible to switch to the second mode at a timing desired by a user.

Further, in the switching of the operation mode, when the switching operation is performed in a state where the player object is placed within a first range in the virtual space, the operation mode may be switched to the second mode.

Based on the above, to switch to the second mode, it is necessary to move a player object into a predetermined range. Thus, it is possible to increase the level of difficulty of an operation for switching to the second mode.

Further, in the switching of the operation mode, when the movement operation is performed in the second mode, the operation mode may be switched to the first mode.

Based on the above, it is possible to set as the second mode the period until a movement operation for a moving body is performed.

Further, the marker may have a range and indicate a position within the range as the target position.

Based on the above, it is possible to recognize that the target position is set within a range indicated by a marker.

Further, the exemplary embodiment may be carried out in the forms of a game apparatus, a game system, and a game processing method.

According to the exemplary embodiment, a target position can be viewed when moving a moving body object in a particular mode, whereby it is possible to aim at a position to which the moving body object moves.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

A description is given of a game program, a game apparatus, a game system, and a game processing method according to an example of an exemplary embodiment. A game system 1, which is an example of the game system, includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
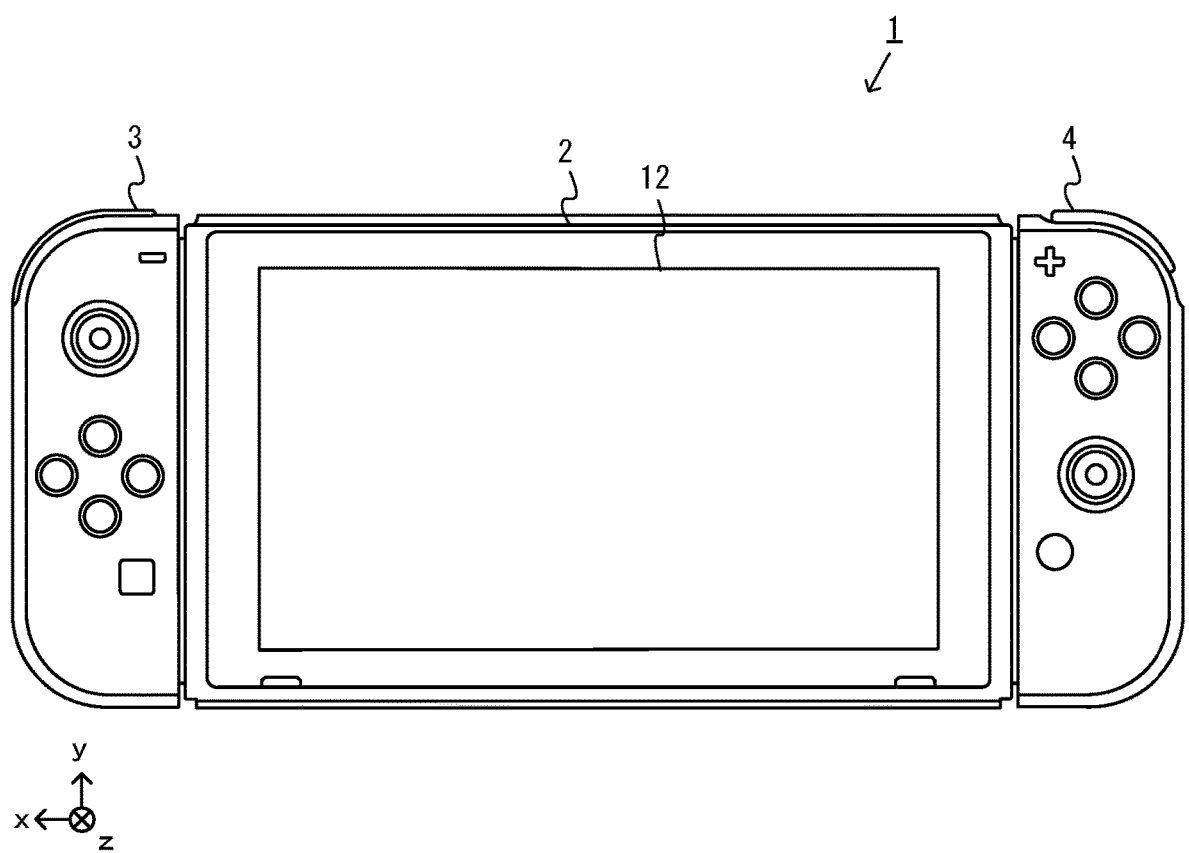
FIG. 1 is a diagram showing a non-limiting example of the state where a left controller 3 and a right controller 4 are attached to a main body apparatus 2 in an example of a game system 1 according to an exemplary embodiment.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
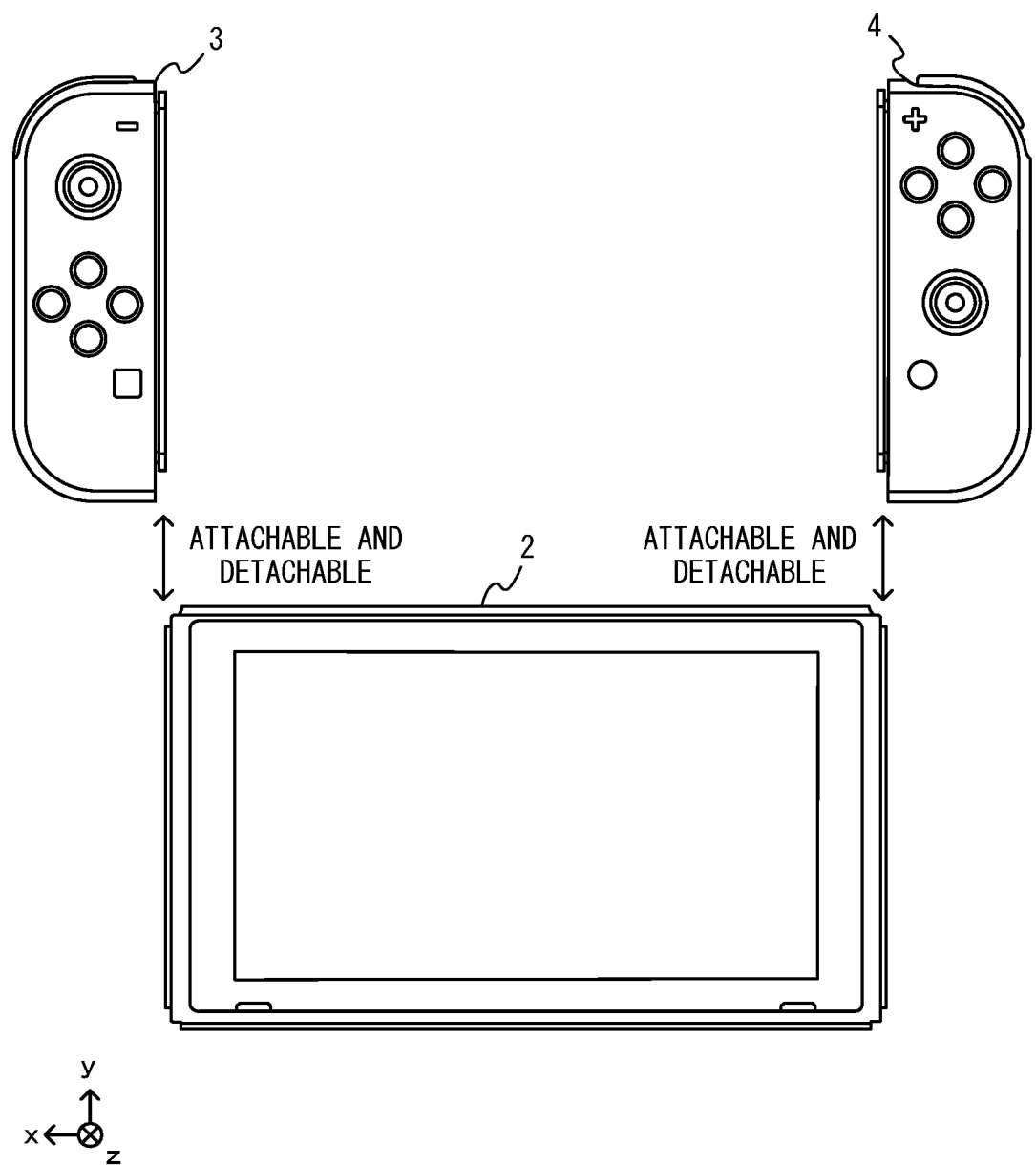
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
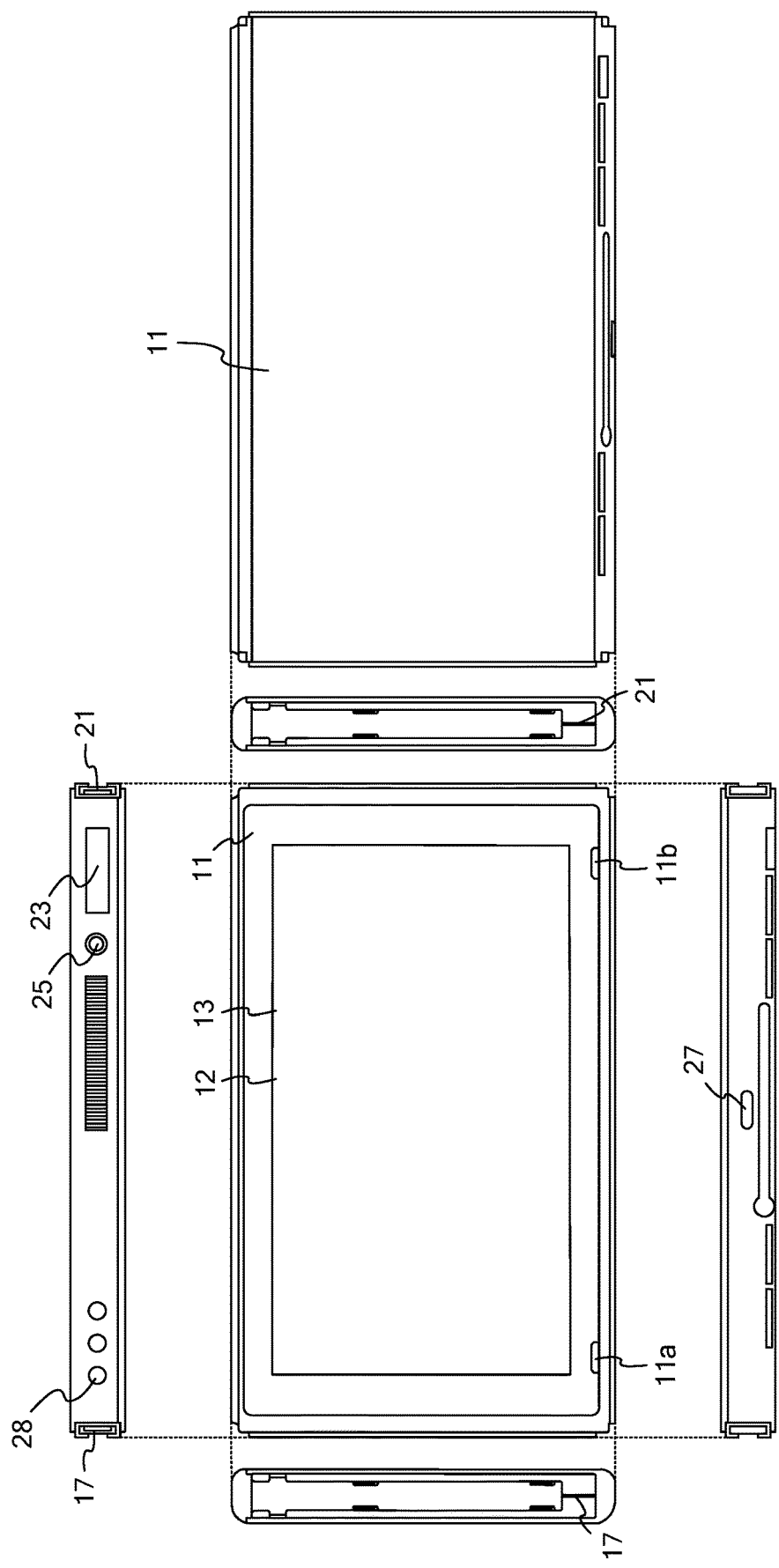
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
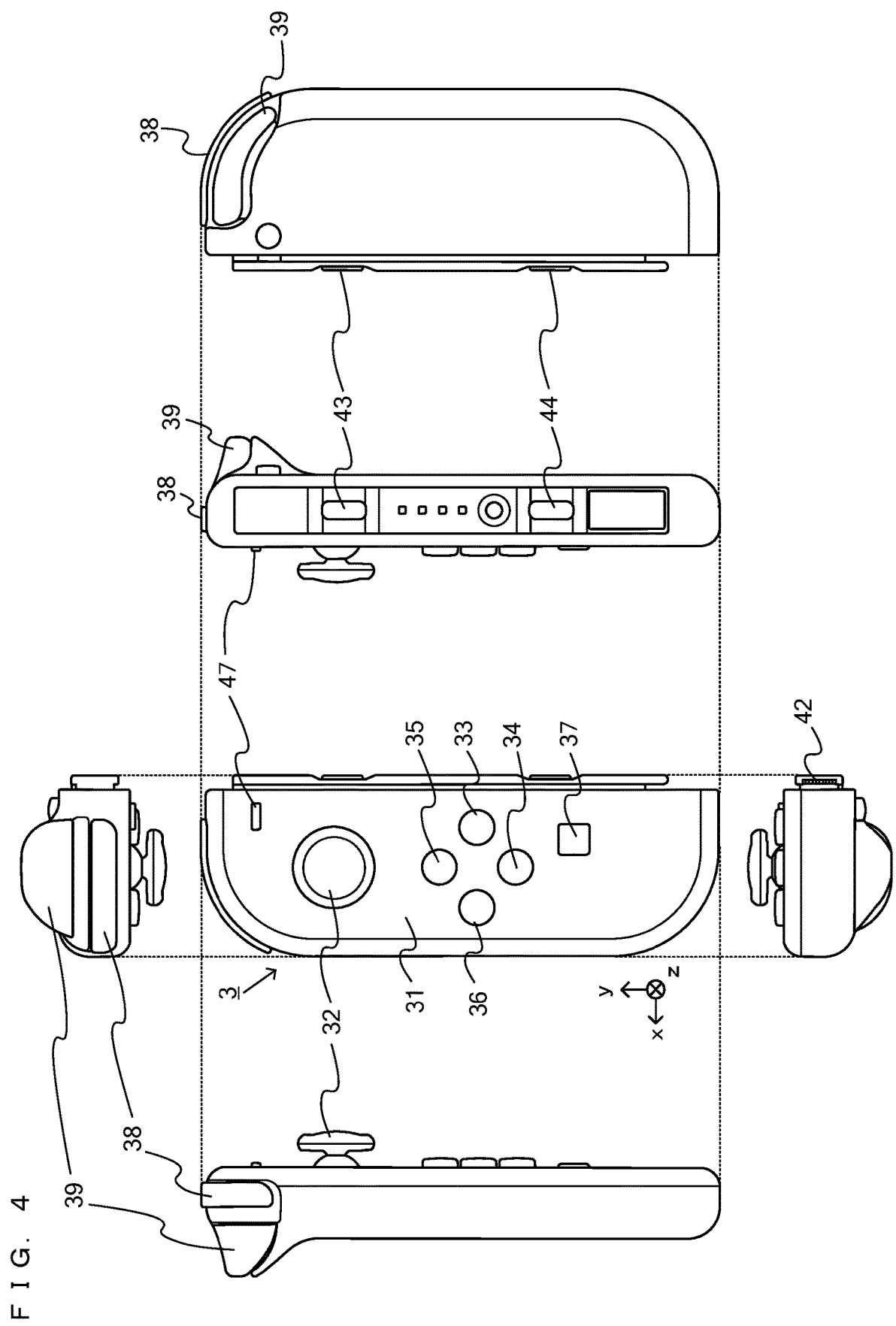
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "-" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
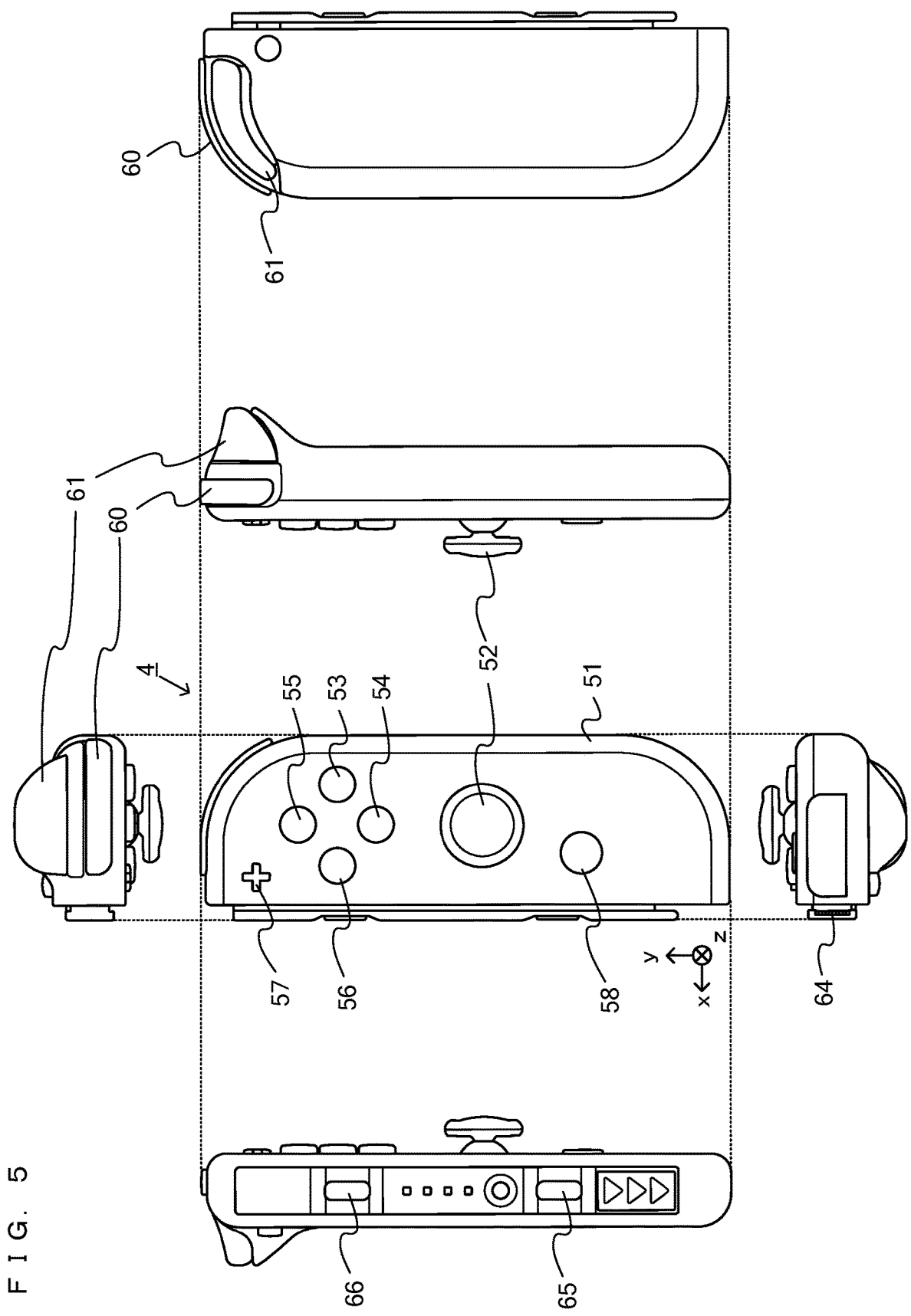
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
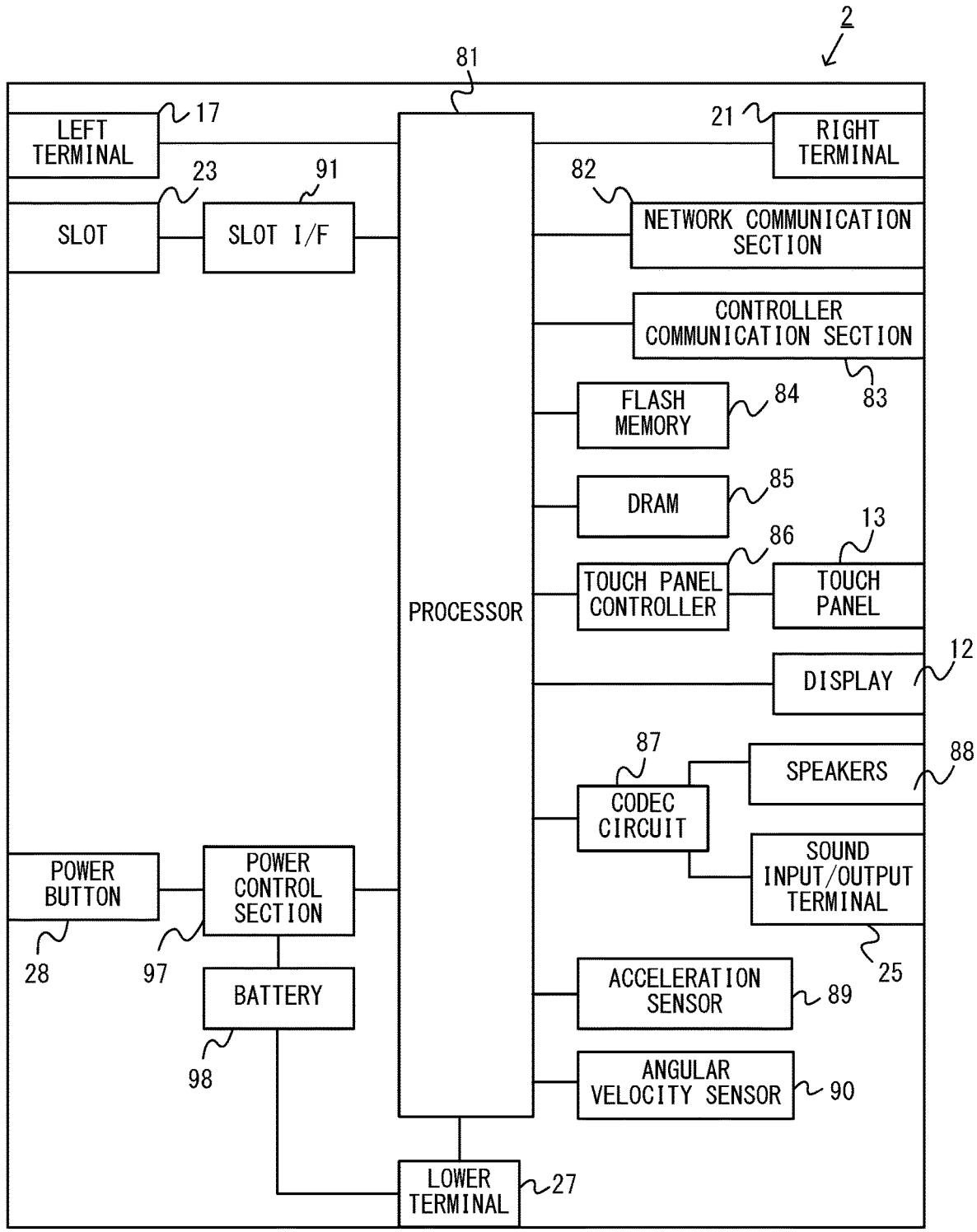
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
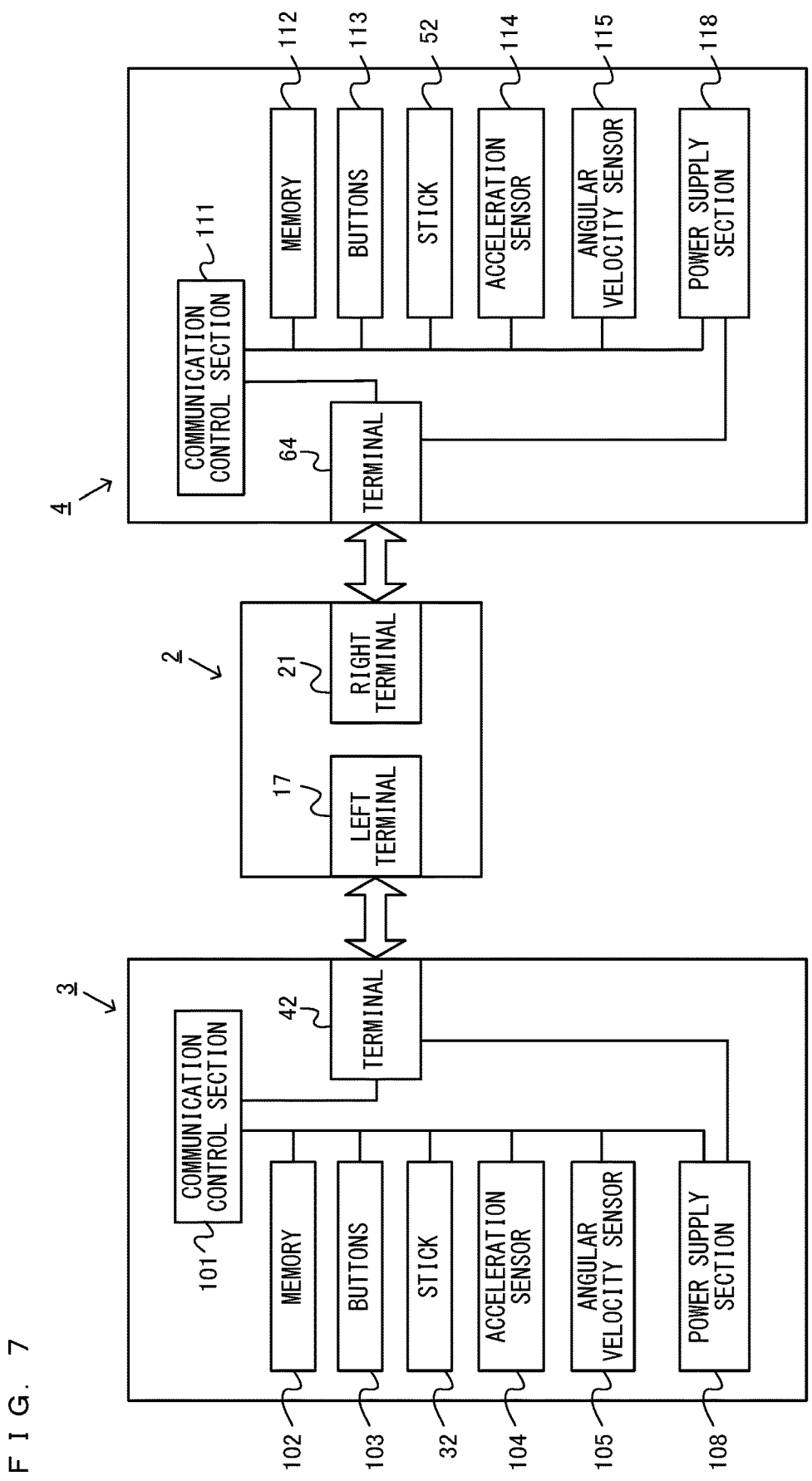
FIG. 7 is a block diagram showing a non-limiting example of the internal configuration of the game system 1.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As describe above, in the game system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle and thereby can output an image (and a sound) to the stationary monitor. As an example, a description is given below using a game system in a use form in which an image is output to the display 12 in the state of the unified apparatus obtained by attaching the left controller 3 and the right controller 4 to the main body apparatus 2. As a form in a case where an operation is performed on an application (e.g., a game application) in this state, a form in which a single user uses both the left controller 3 and the right controller 4 is possible.

Figure 8:
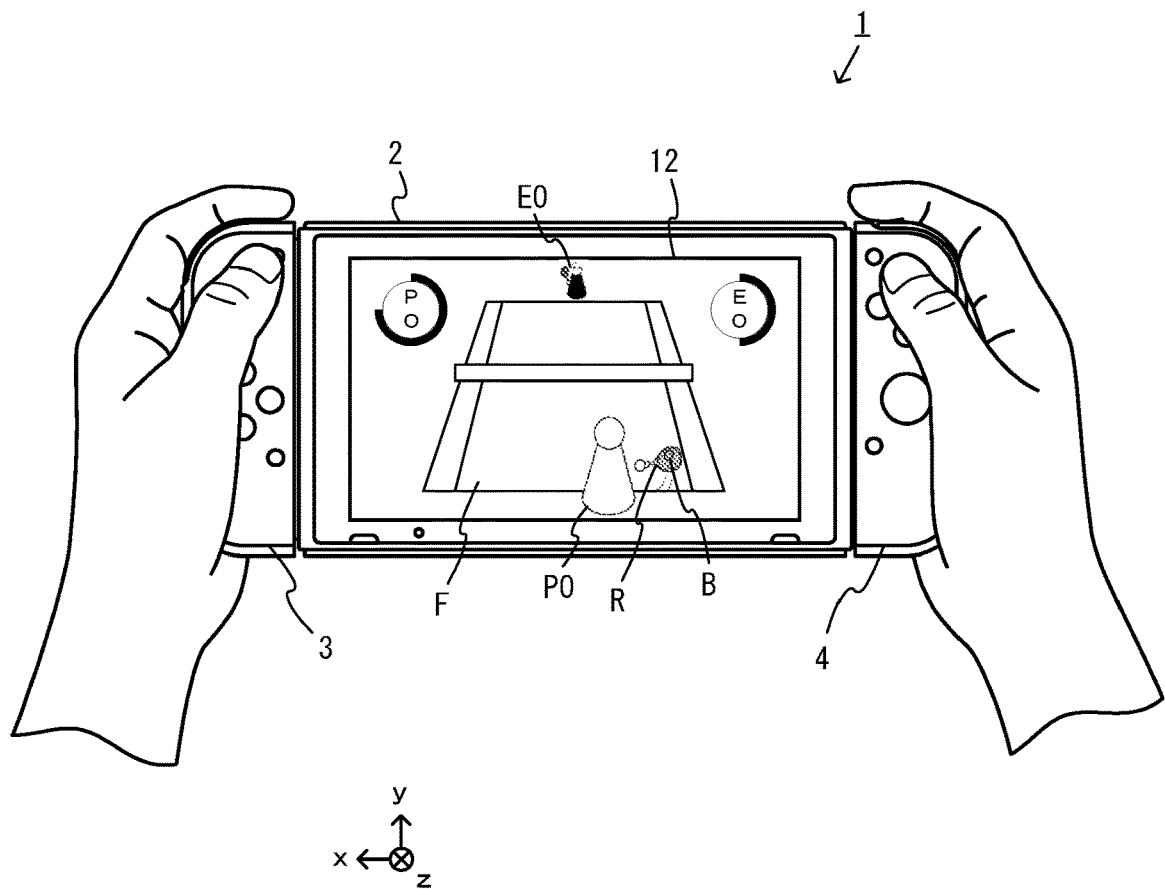
FIG. 8 is a diagram showing a non-limiting example of a game played by attaching the left controller 3 and the right controller 4 to the main body apparatus 2.
Figure 9:
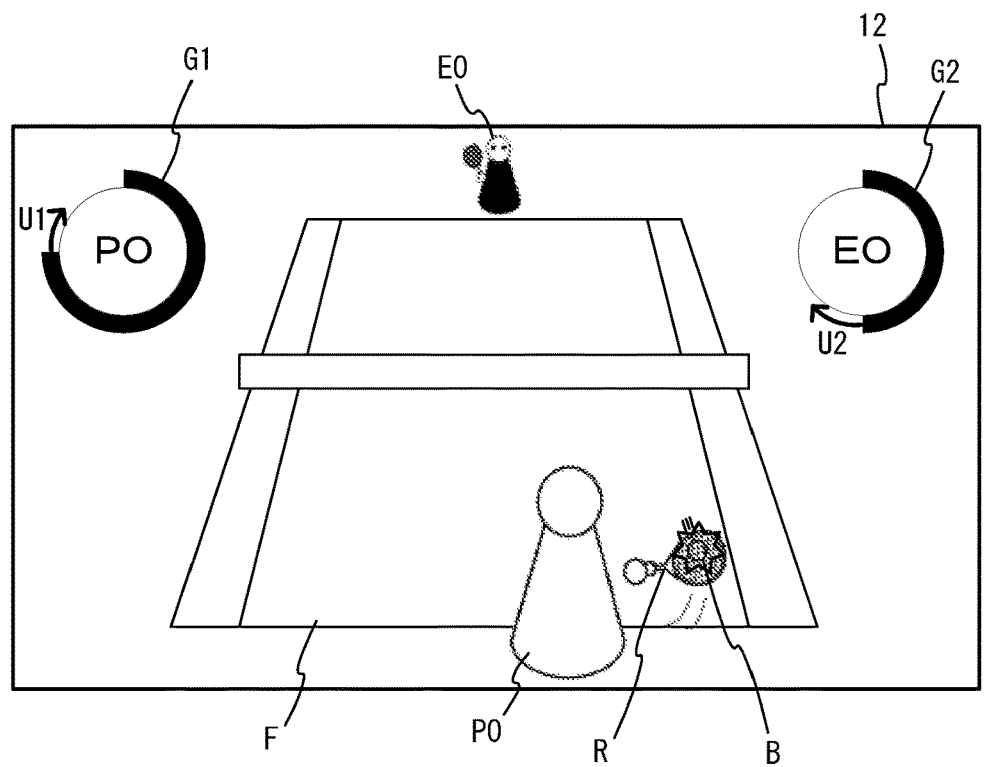
FIG. 9 is a diagram showing a non-limiting example of a game image in a case where a shot is made with a ball in a normal mode.
Figure 10:
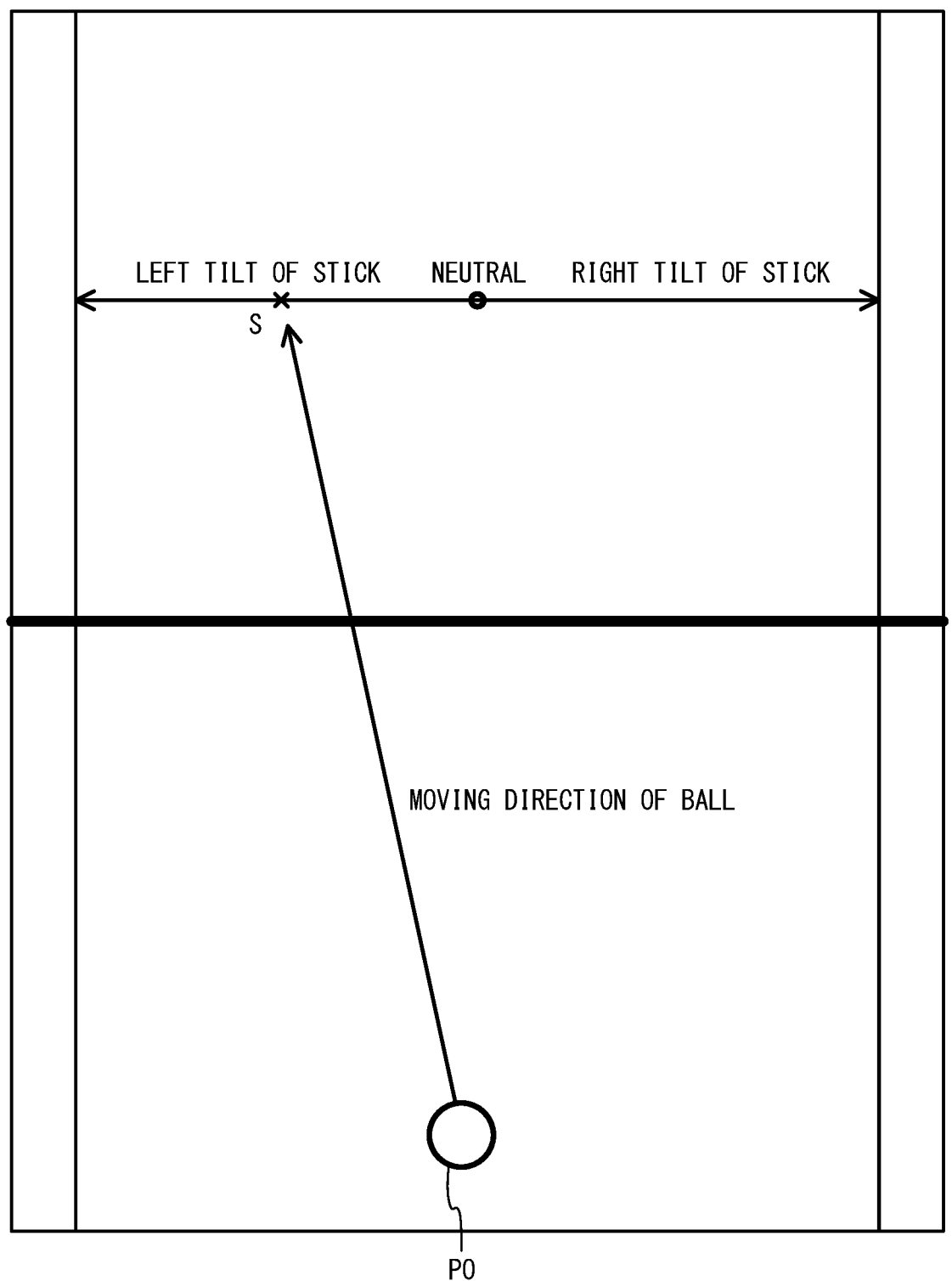
FIG. 10 is a diagram showing a non-limiting example where the moving direction of the ball with which a shot is made in the normal mode is determined.
Figure 11:
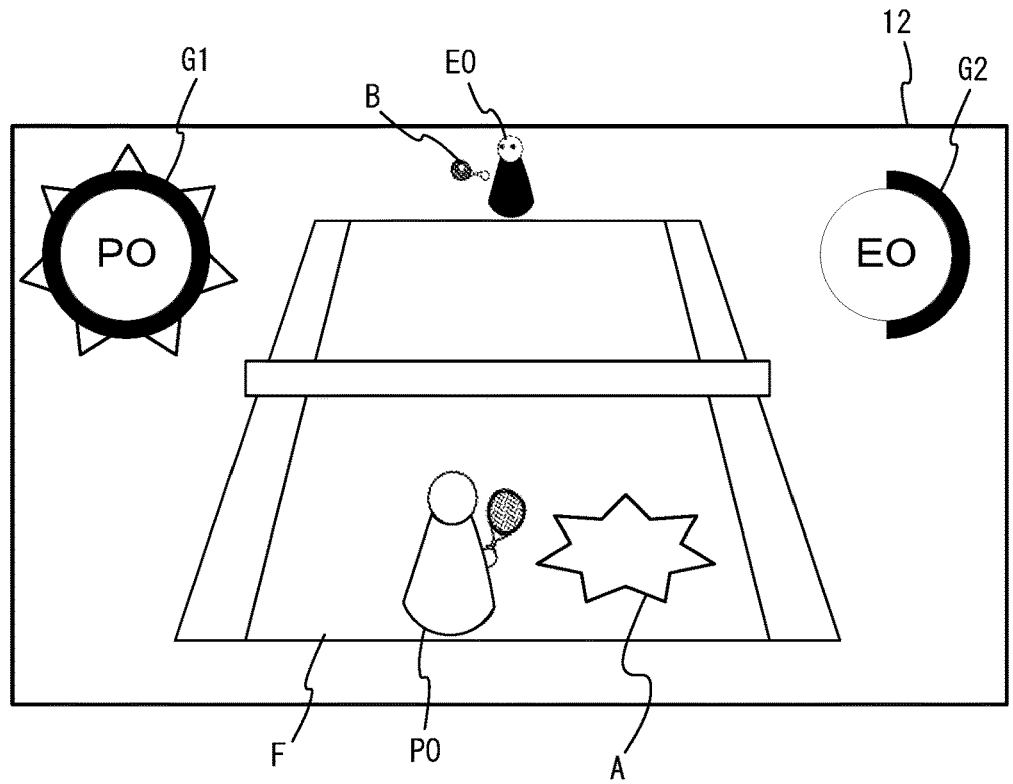
FIG. 11 is a diagram showing a non-limiting example of a game image at a first stage in a case where a shot is made with the ball in a sharpshooting mode.
Figure 12:
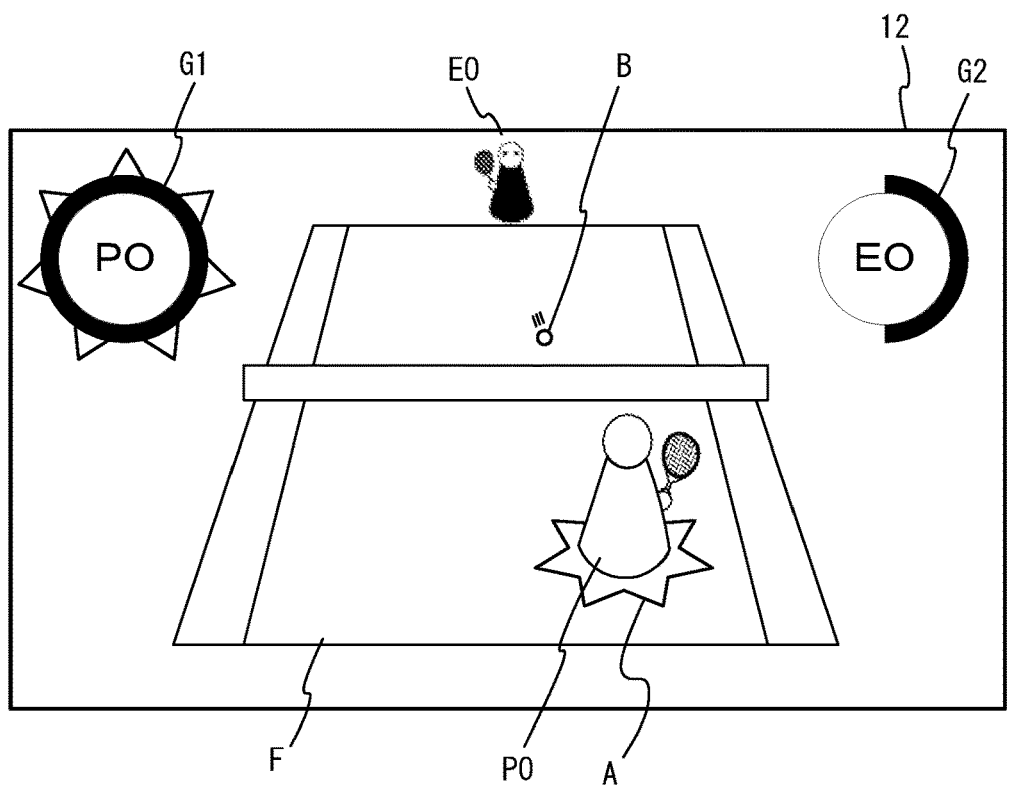
FIG. 12 is a diagram showing a non-limiting example of a game image at a second stage in a case where the shot is made with the ball in the sharpshooting mode.
Figure 13:
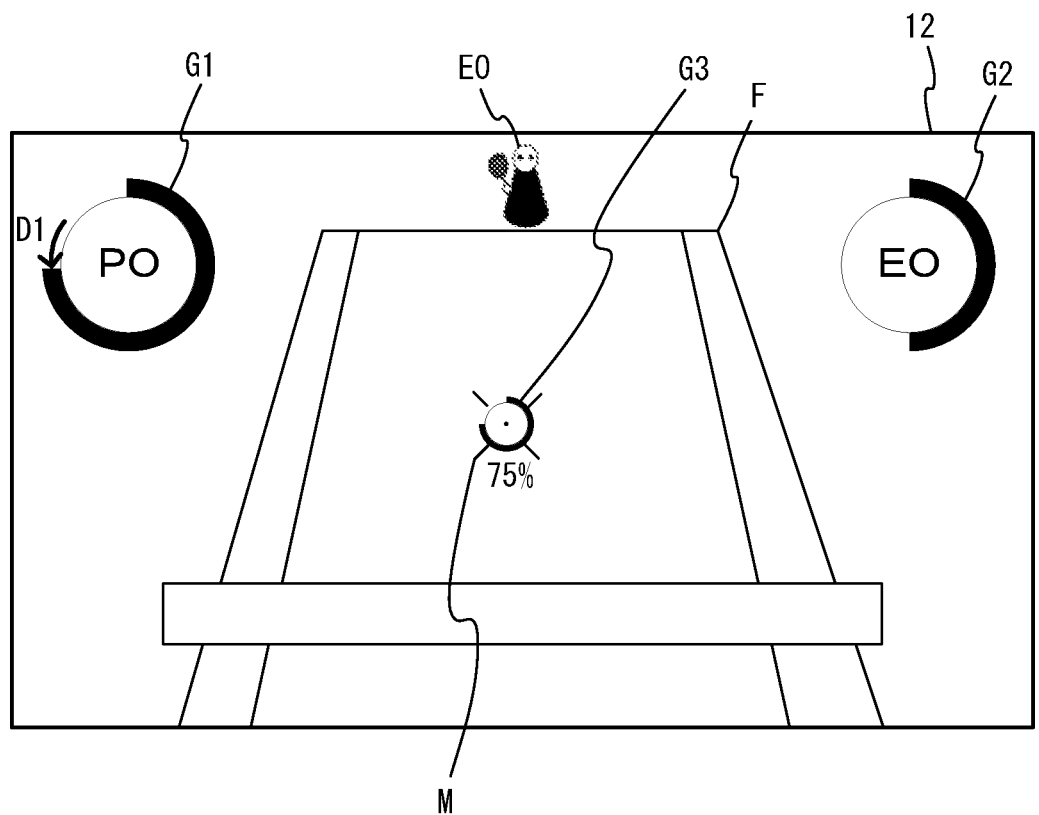
FIG. 13 is a diagram showing a non-limiting example of a game image at a third stage in a case where the shot is made with the ball in the sharpshooting mode.
Figure 14:
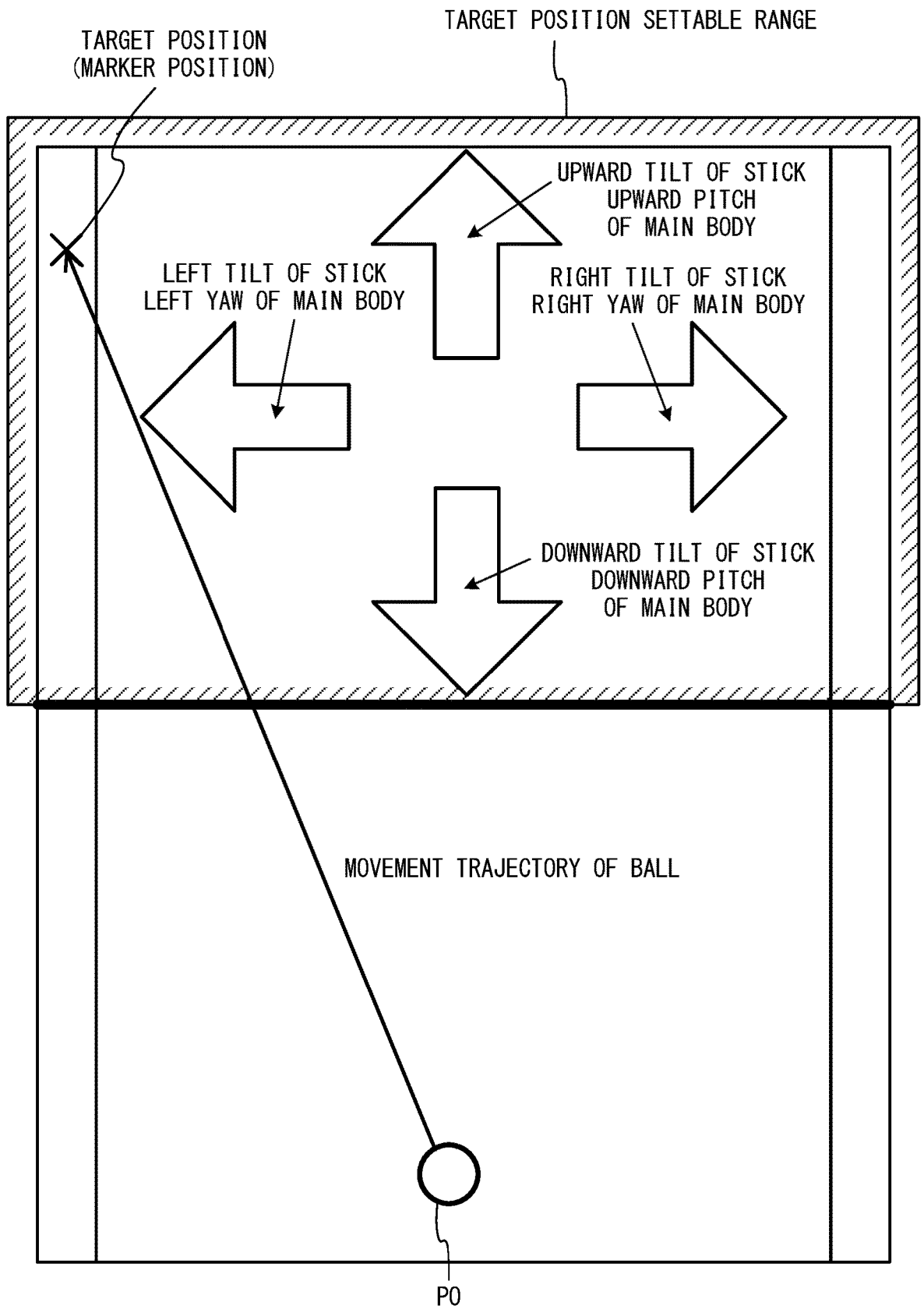
FIG. 14 is a diagram showing a non-limiting example where the movement trajectory of the ball with which a shot is made is determined in the sharpshooting mode.
Figure 15:
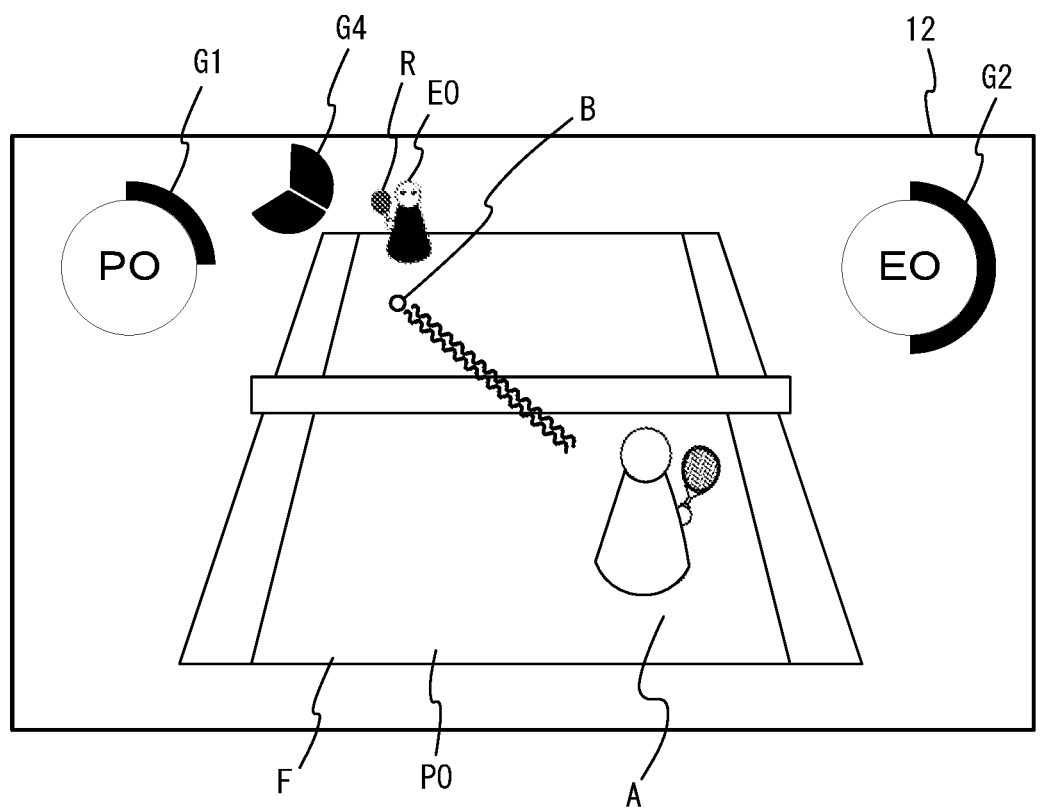
FIG. 15 is a diagram showing a non-limiting example of a game image at a fourth stage in a case where the shot is made with the ball in the sharpshooting mode.

With reference to FIGS. 8 to 15, a description is given below of an exemplary game executed by the game system. It should be noted that FIG. 8 is a diagram showing an exemplary game played by attaching the left controller 3 and the right controller 4 to the main body apparatus 2. FIG. 9 is a diagram showing an example of a game image in a case where a shot is made with a ball in a normal mode in the game. FIG. 10 is a diagram showing an example where the moving direction of the ball with which a shot is made in the normal mode is defined. FIG. 11 is a diagram showing an example of a game image at a first stage in a case where a shot is made with the ball in a sharpshooting mode in the game. FIG. 12 is a diagram showing an example of a game image at a second stage in a case where the shot is made with the ball in the sharpshooting mode in the game. FIG. 13 is a diagram showing an example of a game image at a third stage in a case where the shot is made with the ball in the sharpshooting mode in the game. FIG. 14 is a diagram showing an example where the movement trajectory of the ball with which a shot is made in the sharpshooting mode is defined. FIG. 15 is a diagram showing an example of a game image at a fourth stage in a case where the shot is made with the ball in the sharpshooting mode in the game.

As shown in FIG. 8, when game play is performed by attaching the left controller 3 and the right controller 4 to the main body apparatus 2, a game image is displayed on the display 12 of the main body apparatus 2. When a game is played using such a unified apparatus, as an example, an operation is performed using the operation buttons and the sticks provided in the left controller 3 and the right controller 4. As another example, an operation is performed by the inertial sensors detecting the operation of changing or moving the orientation of the entirety of the unified apparatus. Then, the user can view an image displayed on the display 12 while performing an operation by holding a portion of the left controller 3 attached to the main body apparatus 2 with their left hand and holding a portion of the right controller 4 attached to the main body apparatus 2 with their right hand.

As shown in FIG. 8, in this exemplary game, an image of a game (e.g., a tennis game) where a player object PO and an opponent object EO compete against each other is displayed on the display 12. Specifically, on the display 12, a game image where the player object PO operated by the user of the game system 1 is displayed on the near side of a court F, and the opponent object EO is displayed on the far side of the court F is displayed, and an image of the tennis game where the player object PO and the opponent object EO hit a ball B with each other is displayed. Then, the user operating the left controller 3 and the right controller 4 can operate the player object PO by moving the entirety of the unified apparatus, changing the orientation of the entirety of the unified apparatus, pressing the operation buttons, or tilting the analog sticks. It should be noted that the action of the opponent object EO is automatically controlled by a CPU (e.g., the processor 81). Further, the action of the opponent object EO is controlled by an operation of a user of another game system 1 capable of communicating with the game system 1.

As shown in FIG. 9, for example, a predetermined operation section is operated (e.g., the analog stick 32 is subjected to a tilt operation), whereby the player object PO displayed on the display 12 moves in the court. Further, a predetermined operation section is operated (e.g., the operation of pressing any of the A-button 53, the B-button 54, the X-button 55, and the Y-button 56 is performed) in the state where the player object PO is present near the ball B, whereby the action of the player object PO making a shot with the ball B toward the opponent's side of the court using a racket R is performed. In the exemplary embodiment, this shot action is a shot action in a normal mode. For example, regarding the trajectory of the ball B with which the player object PO makes a shot using the racket R, the type of the shot is determined in accordance with the type of an operation button used for a shot operation. Specifically, when a shot operation is performed by a pressing operation on the A-button 53, a shot is made with the ball B by a top spin shot. When a shot operation is performed by a pressing operation on the B-button 54, a shot is made with the ball B by a slice (underspin) shot. When a shot operation is performed by a pressing operation on the Y-button 56, a shot is made with the ball B by a flat shot. Then, when a shot operation is performed by a pressing operation on the X-button 55 (e.g., pressing the X-button 55 twice), a shot is made with the ball B by a shot using a special technique mastered by the player object PO. It should be noted that the various shot operations correspond to examples of a movement operation for a moving body. Further, the normal mode corresponds to an example of a first mode.

As shown in FIG. 10, the moving direction of the ball with which a shot is made in the normal mode is determined in accordance with the tilt direction and the tilt angle of the analog stick 32 at the point in time when a shot operation is performed. That is, a movement parameter for the ball set in the normal mode is determined based on an operation on the analog stick 32 performed together with a shot operation (a movement operation for a moving body). Here, examples of the operation performed together with the shot operation include a different operation performed simultaneously with the shot operation, a different operation performed integrally with the shot operation, and a different operation performed immediately before or immediately after the shot operation. For example, when a shot operation is performed in a neutral state where the analog stick 32 is not subjected to a tilt operation, a direction toward the center of the opponent's court is set as the moving direction of the ball. When a shot operation is performed in the state where the analog stick 32 is subjected to a left tilt operation, a direction toward a position on the left side of the opponent's court corresponding to the tilt angle is set as the moving direction of the ball. Further, when a shot operation is performed in the state where the analog stick 32 is subjected to a right tilt operation, a direction toward a position on the right side of the opponent's court corresponding to the tilt angle is set as the moving direction of the ball. It should be noted that in the setting of the ball moving direction in the normal mode, a direction toward a position in the opponent's court may be set no matter what tilt angle the analog stick 32 is at. As an example, when a shot operation is performed in the state where the analog stick 32 is subjected to a left tilt operation at the maximum tilt angle, a direction toward a position on the left sideline of the opponent's court is set as the moving direction of the ball. Further, when a shot operation is performed in the state where the analog stick 32 is subjected to a right tilt operation at the maximum tilt angle, a direction toward a position on the right sideline of the opponent's court is set as the moving direction of the ball. For example, when a shot operation is performed in the state where the analog stick 32 is tilted to the left at an intermediate angle, which is between the maximum tilt angle and a neutral angle at which the analog stick 32 is not tilted to either direction, a direction toward a position S corresponding to the intermediate angle, which is between a position on the left sideline of the opponent's court and the center of the opponent's court, is set as the moving direction of the ball. It should be noted that the moving direction of the ball corresponds to an example of a movement parameter.

It should be noted that in an example where the moving direction of the ball is set, the tilt component of a tilt operation in a front-back direction (a positive Y-axis direction or a negative Y-axis direction in FIG. 4) on the analog stick 32 may be ignored, and only the tilt component of a tilt operation in a left-right direction may be used. Further, in an example where the moving direction of the ball is set, the tilt component of a tilt operation in the front-back direction on the analog stick 32 may be set in conjunction with a position in the depth direction of the opponent's court. In this case, the user of the game system 1 can also control the distance at which a shot is made with the ball to some degree based on a tilt operation on the analog stick 32.

Further, the speed or the distance at which the ball B with which a shot is made in the normal mode moves may be determined based on the type of the shot, the position of the player object PO making the shot, the relative position between the player object PO making the shot and the ball B, the timing when a shot operation is performed, or the like.

As described above, in the normal mode, the user of the game system 1 can control the direction in which a shot is made with the ball to some degree based on a tilt operation on the analog stick 32. It is, however, difficult to control in a pinpoint manner the position where the ball B is to be bounced in the opponent's court. Further, in the normal mode, the moving direction of the ball can be set in accordance with the tilt direction and the tilt angle of the analog stick 32. It is, however, not possible to visually confirm the moving direction of the ball and the target position of the ball when a shot operation is performed. Thus, based on their own operational feeling, the user needs to adjust the direction in which to hit the ball back. Thus, also in this sense, it is difficult to control the position where the ball B is to be bounced in the opponent's court.

In the exemplary embodiment, a configuration is employed in which a shot action in a sharpshooting mode can also be performed. Here, when the gauge amount of a sharpshooting gauge G1 in FIG. 9 reaches a predetermined threshold, the normal mode can shift to the sharpshooting mode. When the player object PO satisfies a gauge amount change condition by, for example, performing a predetermined action (e.g., making a shot using a special technique), scoring a service ace, continuing a rally with the opponent object EO a predetermined number of times or more, or making a shot at a predetermined position in the opponent's court (e.g., the corner of the opponent's court), the gauge amount of the sharpshooting gauge G1 changes in the direction in which the normal mode can shift to the sharpshooting mode. For example, the example of FIG. 9 shows an example where the gauge amount of the sharpshooting gauge G1 increases to exceed the predetermined threshold, whereby the normal mode can shift to the sharpshooting mode. Thus, when the gauge amount change condition is satisfied, the gauge amount changes in the direction in which the gauge amount increases in a direction U1 shown in FIG. 9. It should be noted that in the exemplary embodiment, a similar sharpshooting gauge G2 is also set for the opponent object EO. When the gauge amount of the sharpshooting gauge G2 reaches a predetermined threshold, the opponent object EO can also shift to the sharpshooting mode. Further, when the opponent object EO satisfies the gauge amount change condition, the gauge amount of the sharpshooting gauge G2 changes in the direction in which the gauge amount increases in a direction U2 shown in FIG. 9. It should be noted that the sharpshooting mode corresponds to an example of a second mode, and the gauge amount change condition corresponds to an example of a continuable time change condition.

As shown in FIG. 11, when a chance ball with which a sharpshooting shot in the sharpshooting mode can be made is returned from the opponent object EO in the state where the gauge amount of the sharpshooting gauge G1 enables the normal mode to shift to the sharpshooting mode, a sharpshooting area A where the player object PO can make a shot using the sharpshooting mode is drawn on the court F. Then, as shown in FIG. 12, a switching operation for shifting to the sharpshooting mode (e.g., a pressing operation on the first R-button 60) is performed in the state where the player object PO is in the sharpshooting area A, whereby it is possible to switch the operation mode from the normal mode to the sharpshooting mode. It should be noted that as an example of the chance ball, when the opponent object EO misses a shot, or when the opponent object EO hits the ball back to the position where it is easy for the player object PO to make a shot, or when the opponent object EO hits the ball back to the vicinity of the center of the court F of the player object PO, it is determined that the returned ball is a chance ball. Further, the switching operation for shifting to the sharpshooting mode may be the operation of pressing a predetermined operation button (e.g., the first R-button 60) once, or the operation of holding down a predetermined operation button (the operation of continuously pressing the predetermined operation button), or the operation of mashing a predetermined operation button (the operation of repeatedly pressing the predetermined operation button multiple times).

As shown in FIG. 13, in the sharpshooting mode, the opponent's side of the court F is displayed in an enlarged manner on the display 12, and a marker M indicating the target position of the ball B with which the player object PO makes a shot is also displayed on the display 12. Specifically, the marker M is an indicator image indicating a target position where the ball B is to be bounced on the opponent's side of the court F. The central position of the opponent's side of the court F is set as an initial position when the operation mode shifts to the sharpshooting mode. Then, the user performs a marker-indicated position movement operation described later in the sharpshooting mode and thereby can move the target position indicated by the marker M.

As shown in FIG. 14, a target position settable range where the target position indicated by the marker M can move is set based on the opponent's side of the court F. The user performs a predetermined marker-indicated position movement operation and thereby can move the target position indicated by the marker M into the target position settable range. Specifically, the target position indicated by the marker M moves within the target position settable range in accordance with the operation of tilting the analog stick 32 or the operation of changing the direction of the entirety of the game system 1. It should be noted that the target position settable range where the target position indicated by the marker M can move may be set not only on the opponent's side of the court F or a planar surface including the opponent's side of the court F, but also in a three-dimensional range. For example, when a three-dimensional object is present on the opponent's side of the court F or outside the opponent's side of the court F, the target position indicated by the marker M may be able to move onto the surface of the three-dimensional object.

As an example, when the analog stick 32 is tilted in an up direction, the target position indicated by the marker M moves from the center of the opponent's side of the court F to the far side of the opponent's side of the court F at a moving velocity corresponding to the angle of the tilt. When the analog stick 32 is tilted in a down direction, the target position indicated by the marker M moves from the center of the opponent's side of the court F to the near side of the opponent's side of the court F at a moving velocity corresponding to the angle of the tilt. When the analog stick 32 is tilted in a left direction, the target position indicated by the marker M moves from the center of the opponent's side of the court F to the left side of the opponent's side of the court F at a moving velocity corresponding to the angle of the tilt. Then, when the analog stick 32 is tilted in a right direction, the target position indicated by the marker M moves from the center of the opponent's side of the court F to the right side of the opponent's side of the court F at a moving velocity corresponding to the angle of the tilt. It should be noted that the movement of the target position indicated by the marker M based on a tilt operation on the analog stick 32 may be made slow relative to the angle at which the analog stick 32 is tilted. The movement of the target position indicated by the marker M may be used to finely adjust the target position by slowly moving the target position indicated by the marker M. In this case, the amount of adjustment of the target position indicated by the marker M based on a tilt operation on the analog stick 32 in the sharpshooting mode is also smaller than the amount of adjustment of the moving direction of the ball in the normal mode based on a tilt operation on the analog stick 32.

As another example, when it is detected by an inertial sensor (e.g., the angular velocity sensor 105 or the angular velocity sensor 115) provided in the game system 1 that the direction of the entirety of the game system changes in a pitch direction in which the back surface of the game system 1 faces upward, the target position indicated by the marker M moves from the center of the opponent's side of the court F to the far side of the opponent's side of the court F by a distance corresponding to the angle of the change in the pitch direction. When it is detected that the direction of the entirety of the game system changes in a pitch direction in which the back surface of the game system 1 faces downward, the target position indicated by the marker M moves from the center of the opponent's side of the court F to the near side of the opponent's side of the court F by a distance corresponding to the angle of the change in the pitch direction. When it is detected that the direction of the entirety of the game system changes in a yaw direction in which the back surface of the game system 1 faces to the left, the target position indicated by the marker M moves from the center of the opponent's side of the court F to the left side of the opponent's side of the court F by a distance corresponding to the angle of the change in the yaw direction. Then, when it is detected that the direction of the entirety of the game system changes in a yaw direction in which the back surface of the game system 1 faces to the right, the target position indicated by the marker M moves from the center of the opponent's side of the court F to the right side of the opponent's side of the court F by a distance corresponding to the angle of the change in the yaw direction.

It should be noted that in accordance with the motion of the game system 1, the target position indicated by the marker M may move in the opposite direction. For example, when it is detected that the direction of the entirety of the game system changes in a pitch direction in which the back surface of the game system 1 faces upward, the target position indicated by the marker M may move from the center of the opponent's side of the court F to the near side of the opponent's side of the court F by a distance corresponding to the angle of the change in the pitch direction. Further, when it is detected that the direction of the entirety of the game system changes in a pitch direction in which the back surface of the game system 1 faces downward, the target position indicated by the marker M may move from the center of the opponent's side of the court F to the far side of the opponent's side of the court F by a distance corresponding to the angle of the change in the pitch direction. Further, when it is detected that the direction of the entirety of the game system changes in a yaw direction in which the back surface of the game system 1 faces to the left, the target position indicated by the marker M may move from the center of the opponent's side of the court F to the right side of the opponent's side of the court F by a distance corresponding to the angle of the change in the yaw direction. Further, when it is detected that the direction of the entirety of the game system changes in a yaw direction in which the back surface of the game system 1 faces to the right, the target position indicated by the marker M may move from the center of the opponent's side of the court F to the left side of the opponent's side of the court F by a distance corresponding to the angle of the change in the yaw direction.

It should be noted that in the movement of the target position indicated by the marker M based on the orientation of the main body of the game system 1, a change in the orientation of the main body of the game system 1 may be the same as a change in the orientation of a virtual camera or a change in the target position indicated by the marker M. The movement of the target position indicated by the marker M may be used to roughly adjust the target position by relatively quickly moving the target position indicated by the marker M. Specifically, the target position indicated by the marker M is moved so that the marker M is always placed at the fixation point of the virtual camera by moving the orientation of the virtual camera by the same amount as the amount of change in the orientation of the main body of the game system 1. Thus, another virtual space image moves in the state where the marker M is fixed to a predetermined position on a display screen (e.g., the center of the display screen), whereby the state where the marker M moves is represented.

Further, the target position indicated by the marker M may move in accordance with another operation. For example, a configuration may be employed in which the target position indicated by the marker M moves in accordance with, instead of or in addition to the above operations, the operation of pressing an operation button, the operation of pressing an operation key, the operation of pushing in an operation stick, the operation of touching an operation surface, or the like.

As shown in FIG. 14, the ball with which a shot is made using the target position set in the sharpshooting mode (the position indicated by the marker M) moves along a ball movement trajectory in which the ball reaches the court at the set target position and bounces at the target position. For example, similarly to the normal mode, also in the sharpshooting mode, a top spin shot, a slice (underspin) shot, a flat shot, or the like can be made as a shot, depending on an operation button used for the shot. By either shot, however, the ball movement trajectory in which the ball bounces at the target position is set. Thus, the user can make a shot by aiming at the position indicated by the marker M in a pinpoint manner. That is, by a shot in the normal mode, it is difficult to control in a pinpoint manner the position where the ball B is to be bounced in the opponent's court. In the sharpshooting mode, however, by visually confirming the position of the marker M, it is possible to directly control the position where the ball B is to be bounced. Thus, it is easy to control in a pinpoint manner the position where the ball B is to be bounced in the opponent's court. It should be noted that when an obstacle is present on the set ball movement trajectory, the ball B can change the trajectory by colliding with the obstacle. In this case, the ball B may not reach the target position set in advance. It should be noted that the target position corresponds to an example of a movement parameter. It should be noted that in the set ball movement trajectory, the ball B may linearly move toward the target position, or the ball B may move in a curved manner toward the target position.

It should be noted that based on the target position set in the sharpshooting mode, at least one of the moving direction and the moving velocity of the ball may be set. In this case, although at least one of the moving direction and the moving velocity of the ball is set based on the target position, ultimately, the ball does not necessarily reach the target position. Thus, even when the user takes aim based on the marker M, some error occurs in a game setting. Even in this case, however, it is possible to visually confirm the target position of the ball when performing a shot operation using the marker M. Thus, it is easier to control the position where the ball B is to be bounced in the opponent's court than in the normal mode. It should be noted that in this case, at least one of the moving direction and the moving velocity of the ball corresponds to an example of a movement parameter.

Here, as shown in FIG. 14, the target position settable range where the target position indicated by the marker M can move may be provided up to a position outside the opponent's side of the court F (i.e., the position where the ball is out, and an area outside the sidelines and the baseline). In this case, the user having selected a shot in the sharpshooting mode can aim not only at the inside of the opponent's court, but also at a subtle position outside the opponent's court. Thus, it is also possible to make an unconventional strategic shot. For example, when various objects that influence game play by being hit by the ball are placed outside the opponent's court, a shot is made by aiming at these objects, thereby enabling an unconventional strategic shot.

It should be noted that as a method for performing representation by displaying on the display 12 the state where the marker M moves relative to the court F, a virtual camera for generating a virtual space image displayed on the display 12 and the marker M may be moved, or only the marker M may be moved. For example, in the first case, in the state where the positional relationship between the virtual camera and the marker M in a virtual space is fixed (e.g., the marker M is fixed to the center of the screen), the virtual camera and the marker M are moved in a direction corresponding to the above operations. In this case, on the display 12, the movement of the marker M is represented by a virtual space image other than the marker M moving in a direction opposite to the direction corresponding to the above operations.

Further, there is a time limit on the state where the target position indicated by the marker M can be moved relative to the court F. A limit is provided on a continuable time in which the sharpshooting mode can be continued. That is, there is a limit on the time for taking aim at the position to which the user moves the ball by moving the target position indicated by the marker M, whereby it is possible to provide the level of difficulty of the operation of moving the marker M to a position desired by the user. For example, the continuable time in which the sharpshooting mode can be continued is set in accordance with the gauge amount of the sharpshooting gauge G1. Then, as shown in FIG. 13, when the sharpshooting mode is continued, the gauge amount of the sharpshooting gauge G1 changes in a gradually decreasing manner in the direction in which the gauge amount decreases in a direction D1 shown in FIG. 13. It should be noted that also at the moment that the normal mode shifts to the sharpshooting mode, the gauge amount of the sharpshooting gauge G1 may decrease by a certain amount. Then, when the gauge amount of the sharpshooting gauge G1 becomes less than a predetermined gauge amount (e.g., the gauge amount becomes 0), the sharpshooting mode ends, and the operation of moving the target position indicated by the marker M is also prohibited. Then, a shot using the sharpshooting mode becomes a missed shot (e.g., a shot hit back as a weak high-flying ball) and is hit back toward the opponent's court. On the other hand, when a ball shot operation (a movement operation for a moving body) is performed by ending the setting of the target position indicated by the marker M in the state where the gauge amount of the sharpshooting gauge G1 is greater than or equal to a predetermined gauge amount, the sharpshooting mode ends in accordance with the shot operation and shifts to the normal mode, and a scene where the ball B is hit back toward the opponent's court by a sharpshooting shot such that the position specified by the marker M is the target position is also represented (see FIG. 15). It should be noted that as shown in FIG. 13, a gauge amount indicating the continuable time in which the sharpshooting mode can be continued is also displayed as a neighborhood gauge G3 at a position near the marker M. Here, the gauge amount of the neighborhood gauge G3 displayed in the sharpshooting mode is the same as the gauge amount indicated by the sharpshooting gauge G1. However, the gauge amount is always displayed near the marker M, whereby it is easy for the user to adjust the target position indicated by the marker M while grasping the gauge amount, i.e., the remaining time in which the position of the marker M can be adjusted.

Further, as described above, a shot in the sharpshooting mode at least requires the time for adjusting the target position indicated by the marker M. Thus, it is possible that a time longer than a shot in the normal mode is required until a shot is made with the ball B. In the exemplary embodiment, to adjust such a time until a shot is made in the sharpshooting mode, then in the sharpshooting mode, the moving velocity of the ball B hit by the opponent object EO may be made slow, or the movement of the ball B may be temporarily stopped.

As shown in FIG. 15, when a shot is made with the ball B by performing a ball shot operation in the sharpshooting mode, the sharpshooting mode shifts to the normal mode, and also the ball B with which the sharpshooting shot is made is hit back toward the target position on the opponent's side of the court F (the position where the marker M is ultimately set). The opponent object EO can also hit back the ball B with which the shot is made by the sharpshooting shot. However, when a predetermined hitting back condition is not satisfied, the racket R held by the opponent object EO may be damaged. Here, for each of the rackets R held by the player object PO and the opponent object EO for play, an endurance degree at four levels is set. Then, when the racket R is damaged, there is a case where the ball B cannot be hit back, and therefore, the opponent obtains a point, and the endurance degree decreases by one level. Further, the racket R is damaged such that the endurance degree reaches a level 0, whereby the racket R for which this endurance degree is set cannot be used. In this case, there can also be a case where a player using the racket R damaged such that the endurance degree is the level 0 abandons and loses this game, unless the player owns another racket R of which the endurance degree is a level 1 or higher. Further, the player has no choice but to abandon also the planned game after that. As an example, in the example of FIG. 15, a degree-of-endurance gauge G4 is displayed that indicates that the endurance degree of the racket R held by the opponent object EO is a level 2. For example, as a hitting back condition for hitting back the ball B by a sharpshooting shot without damaging the racket R, the hitting back of the ball B by a sharpshooting shot at a good timing is possible. When a shot that does not satisfy this condition is made, the racket R of the player having made the shot is damaged, and the endurance degree level decreases.

It should be noted that in the above example, an example has been used where, when the racket R is damaged, the endurance degree level of the racket R decreases, thereby indicating the use limit on the racket R. The use limit may be represented by another parameter. For example, when the racket R is damaged, the damage degree level of the racket R may increase, thereby indicating the use limit on the racket R. In this case, the racket R is damaged such that the damage degree is a maximum level (e.g., a level 3), whereby the racket R for which this damage degree is set cannot be used.

Further, the phenomenon that damage to the racket R decreases the endurance degree level may also occur by a shot in the normal mode. For example, an easier hitting back condition than the hitting back condition in the sharpshooting shot may also be set for a shot in the normal mode. Then, a setting may be made so that when the ball B is hit back, and this easier hitting back condition is not satisfied, the endurance degree level of the racket R used for the hitting back decreases by a predetermined endurance degree level.

Further, in the above exemplary game, an example has been used where during the game in the normal mode, the gauge amount of the sharpshooting gauge changes in the direction in which the gauge amount increases (i.e., the direction in which the normal mode can shift to the sharpshooting mode). Alternatively, there may be a case where the gauge amount changes in the opposite direction in the normal mode. For example, the player object PO misses a shot or fatigues by an increase in the moving distance at which the player object PO moves on the court during the game, whereby the gauge amount of the sharpshooting gauge may change in the direction in which the gauge amount decreases (i.e., the direction in which the normal mode cannot shift to the sharpshooting mode).

Further, in the above exemplary game, an example has been used where during the game in the normal mode, the gauge amount of the sharpshooting gauge increases from the state where the gauge amount is small to the state where the gauge amount is great, whereby, when the gauge amount reaches a predetermined amount, the normal mode can shift to the sharpshooting mode. The setting of the gauge, however, may be another form. For example, the gauge may be configured such that in the game in the normal mode, the gauge amount of the sharpshooting gauge decreases from the state where the gauge amount is great (e.g., a full gauge state) to the state where the gauge amount is small, whereby, when the gauge amount becomes less than a predetermined amount (e.g., the gauge amount is 0), the normal mode can shift to the sharpshooting mode.

Further, in the above exemplary game, a tennis game has been used where the player object PO and the opponent object EO face each other and each use a piece of equipment (the racket R) for moving the ball B, which is a moving body object. Alternatively, a game may be employed where the moving body object is moved using another piece of equipment or the body itself of the player object PO or the opponent object EO. For example, possible examples of a game where the player object PO facing the opponent object EO moves the moving body object in a direction away from the player object PO using a piece of equipment include tennis, table tennis, badminton, baseball, hockey, and the like. Further, possible examples of a game where the player object PO facing the opponent object EO moves the moving body object in a direction away from the player object PO using the body of the player object PO include volleyball and the like. Further, possible examples of a game where the player object PO facing the opponent object moves the moving body object in a direction away from the player object PO using the body of the player object PO in a shared field include football, basketball, soccer, handball, and the like. Further, possible examples of a game where, without facing the opponent object EO, the player object PO moves the moving body object in a direction away from the player object PO using a piece of equipment include golf, fishing, sharpshooting, Kyūdō, and the like. Further, possible examples of a game where, without facing the opponent object EO, the player object PO moves the moving body object in a direction away from the player object PO using the body of the player object PO include bowling, curling, the shot put, the javelin throw, the discus throw, and the like. It should be noted that the abandonment of the game (defeat) due to the fact that the endurance degree level of the above piece of equipment becomes the level 0 can also be applied to these pieces of equipment. As an example, in a case where the exemplary embodiment is applied to golf, and if a shot is missed or a special shot is made when a shot is made with a ball using a piece of equipment (a golf club), it is also possible that the endurance degree of the piece of equipment decreases. It should be noted that in the case of a game where the moving body object is moved using the body of the player object PO or the body of the opponent object EO, a setting may be made so that when damage to the body itself by collision with the moving body object exceeds a predetermined amount, the object abandons (loses) the game.

It should be noted that depending on the game to which the exemplary embodiment is applied, a configuration may be employed in which, in the sharpshooting mode, not only the reaching point of the moving body object (the target position where the moving body object bounces on the court) but also the intermediate passing point of the moving body object is aimed at. For example, when the exemplary embodiment is applied to golf, a situation is possible where the space between trees is aimed at as the passing point of a ball as an example of the moving body object, and a shot is made with the ball by passing the ball through the space. Further, when the exemplary embodiment is applied to volleyball, a situation is possible where the space between blocks of opponent objects is aimed at as the passing point of a ball as an example of the moving body object, and the ball is attacked to the opponent's court by passing the ball through the space. Further, when the exemplary embodiment is applied to soccer, a situation is possible where the space between opponent objects is aimed at as the passing point of a ball as an example of the moving body object, and the ball is shot by passing the ball through the space. Further, when the exemplary embodiment is applied to curling, a situation is possible where the space between opponent's stones is aimed at as the passing point of a stone as an example of the moving body object, and the stone is slid by passing the stone between the opponent's stones. In a configuration in which the intermediate pass point of the moving body object is thus aimed at, then in the sharpshooting mode, when the moving body object collides with an obstacle such as a tree or an opponent object along the way, a marker M indicating the collision position is displayed. The marker M is moved so as not to hit the obstacle, whereby the moving body object is on a trajectory that enables the moving body object to pass near the obstacle and prevents the moving body object from colliding with the obstacle, and the marker M is displayed such that a position as a reaching point after the passing is the target position. It should be noted that in a configuration in which the intermediate pass point of the moving body object is aimed at, then in the sharpshooting mode, even when a trajectory is set so that the moving body object passes near an obstacle without colliding with the obstacle, the marker M may be displayed at a position indicating a space near the obstacle by which the moving body object will pass according to estimation.

Further, the marker M may indicate not only a point but also a range. In this case, the marker M may be set so that the target position indicated by the marker M is the central position of the marker M. Alternatively, the marker M may be set so that a random position within the range of the marker M is the target position. Also in the second case, the marker M is used to indicate the target position. When a random position within the range of the marker M is the target position, for example, in the sharpshooting mode, the longer the distance to the target position, the greater the range of the marker M. As a result, the range where the target position is located may be more dispersed. For example, in the case of a golf game or the like where the game field is relatively wide, it is possible that the size of the range of the marker M is changed in accordance with the distance to a target position at which a shot is made. It should be noted that the position of the target position set in the marker M may not be a random position within the range of the marker M. The marker M may be set so that a position within the range of the marker M based on a predetermined rule is the target position. Further, the size of the range of the marker M may be changed not only according to the distance to the target position in the sharpshooting mode, but also according to the growth degree, the proficiency degree, or the like of the player object PO.

Figure 16:
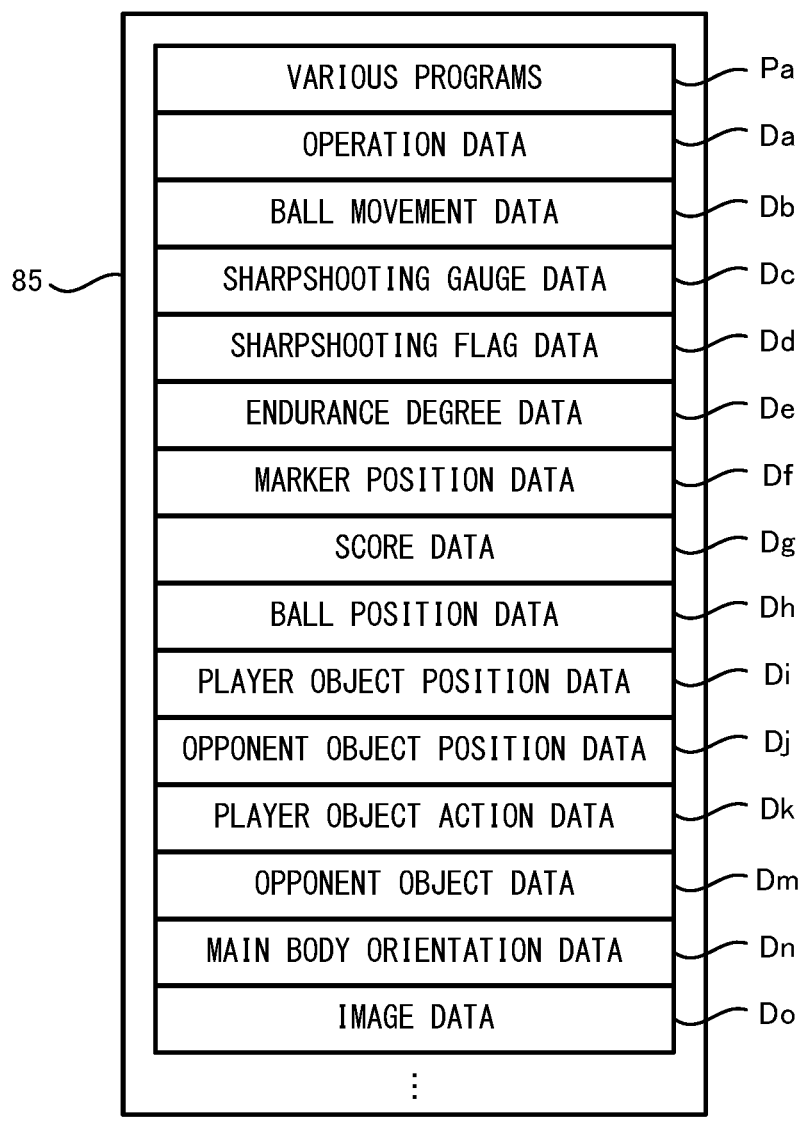
FIG. 16 is a diagram showing a non-limiting example of a data area set in a DRAM 85 of the main body apparatus 2 in the exemplary embodiment.

Next, with reference to FIGS. 16 to 19, a description is given of an example of specific processing executed by the game system 1 according to the exemplary embodiment. FIG. 16 is a diagram showing an example of a data area set in the DRAM 85 of the main body apparatus 2 according to the exemplary embodiment. It should be noted that in the DRAM 85, in addition to data shown in FIG. 16, data used for other processes is also stored, but is not described in detail here.

In a program storage area of the DRAM 85, various programs Pa, which are executed by the game system 1, are stored. In the exemplary embodiment, as the various programs Pa, a communication program for communicating with another game system and another apparatus, an application program for performing information processing (e.g., game processing) based on data acquired from the left controller 3 and/or the right controller 4, and the like are stored. It should be noted that the various programs Pa may be stored in advance in the flash memory 84, or may be acquired from a storage medium attachable to and detachable from the game system 1 (e.g., a storage medium attached to the slot 23) and stored in the DRAM 85, or may be acquired from another apparatus via a network such as the Internet and stored in the DRAM 85. The processor 81 executes the various programs Pa stored in the DRAM 85.

Further, in a data storage area of the DRAM 85, various data used for processes such as information processing and the like executed by the game system 1 is stored. In the exemplary embodiment, in the DRAM 85, operation data Da, ball movement data Db, sharpshooting gauge data Dc, sharpshooting flag data Dd, endurance degree data De, marker position data Df, score data Dg, ball position data Dh, player object position data Di, opponent object position data Dj, player object action data Dk, opponent object data Dm, main body orientation data Dn, image data Do, and the like are stored.

The operation data Da is operation data appropriately acquired from each of the left controller 3 and/or the right controller 4. As described above, operation data acquired from each of the left controller 3 and/or the right controller 4 includes information regarding an input (specifically, information regarding an operation or the detection result of the sensor) from each of the input sections (specifically, each button, each analog stick, and each sensor). In the exemplary embodiment, operation data is acquired in a predetermined cycle from each of the left controller 3 and/or the right controller 4 attached to the main body apparatus 2, and the operation data Da is appropriately updated using the acquired operation data. It should be noted that the update cycle of the operation data Da may be such that the operation data Da is updated every frame, which is the cycle of the processing described later executed by the main body apparatus 2, or is updated every cycle in which the above operation data is acquired.

The ball movement data Db is data set so that the ball B as an example of the moving body object moves in the virtual space. The ball movement data Db includes data indicating a ball moving direction, a ball moving velocity, a ball movement trajectory, and the like.

The sharpshooting gauge data Dc is data indicating the state of a sharpshooting gauge, and for example, is data indicating the gauge amount of each sharpshooting gauge.

The sharpshooting flag data Dd is data indicating a sharpshooting flag that is set to on when the operation mode is set to the sharpshooting mode.

The endurance degree data De is data indicating the endurance degree level of the racket R used by each of the player object PO and the opponent object EO to make a shot with the ball B.

The marker position data Df is data indicating the position of the marker M displayed in the sharpshooting mode and is data indicating the target position indicated by the marker M.

The score data Dg is data indicating the game score of the player object PO and the opponent object EO in the tennis game.

The ball position data Dh is data indicating the position of the ball B in the virtual space. The player object position data Di is data indicating the position of the player object PO in the virtual space. The opponent object position data Dj is data indicating the position of the opponent object EO in the virtual space.

The object action data Dk is data indicating the orientation, the direction, the action, and the like of the player object PO in the virtual space. The opponent object data Dm is data indicating the orientation, the direction, the action, and the like of the opponent object EO in the virtual space.

The main body orientation data Dn is data indicating the orientation of the main body of the game system 1 when the operation mode shifts to the sharpshooting mode.

The image data Do is data for displaying images (e.g., an image of a virtual object, a field image, and a background image) on the display 12 of the main body apparatus 2 when a game is performed.

Figure 17:
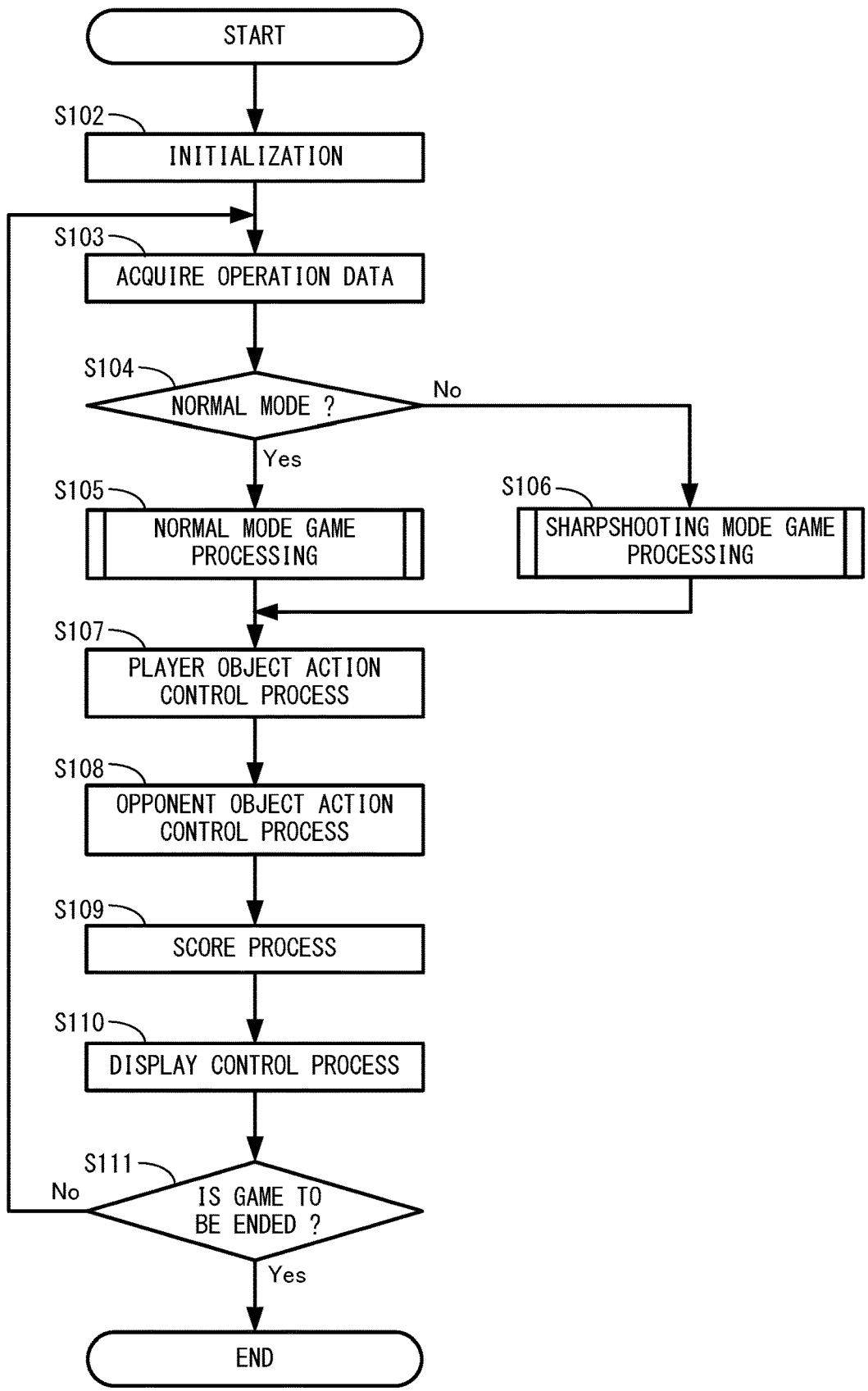
FIG. 17 is a flow chart showing a non-limiting example of game processing executed by the game system 1.
Figure 18:
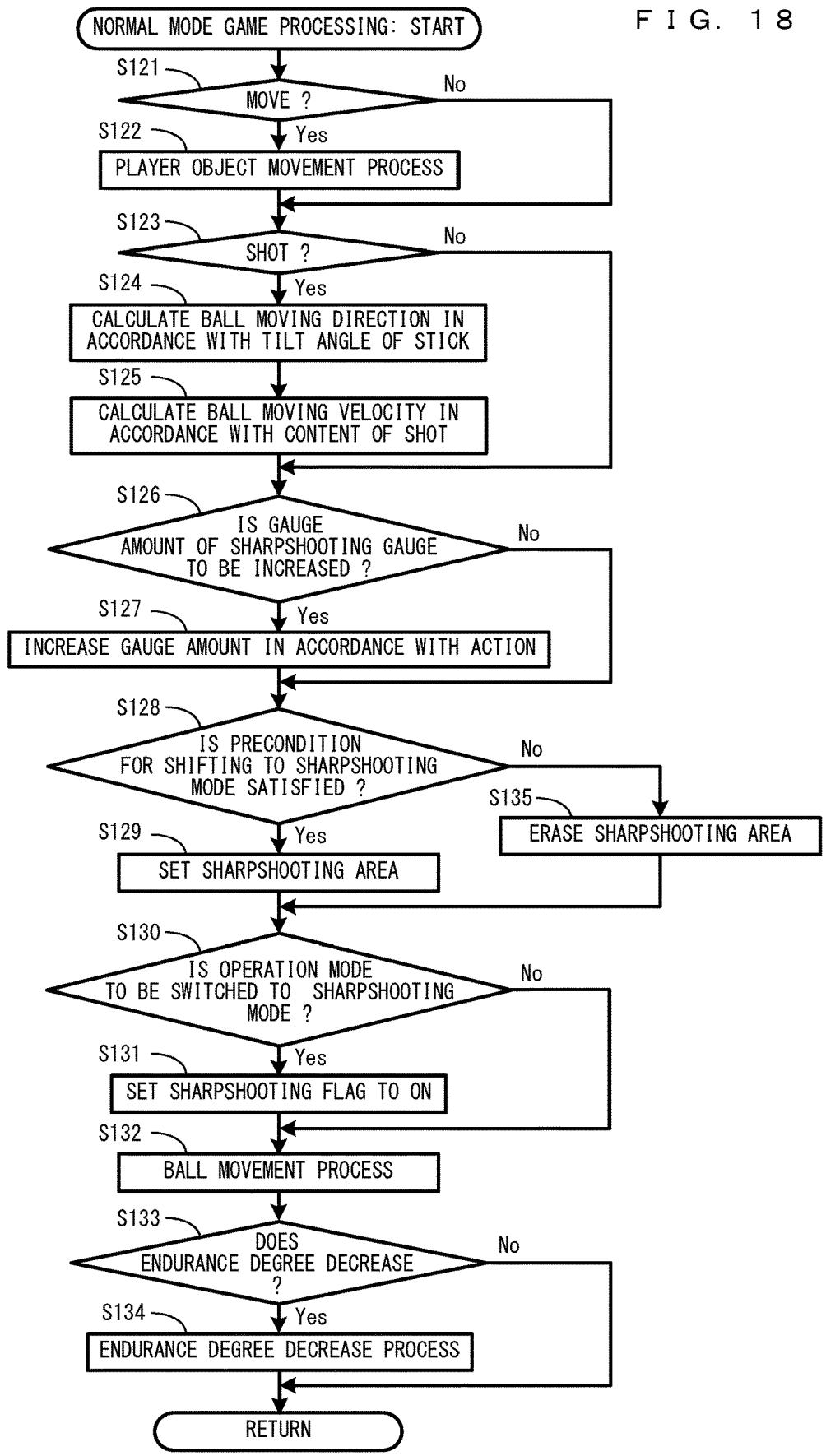
FIG. 18 is a subroutine showing non-limiting examples of the details of normal mode game processing performed in step S105 in FIG. 17.
Figure 19:
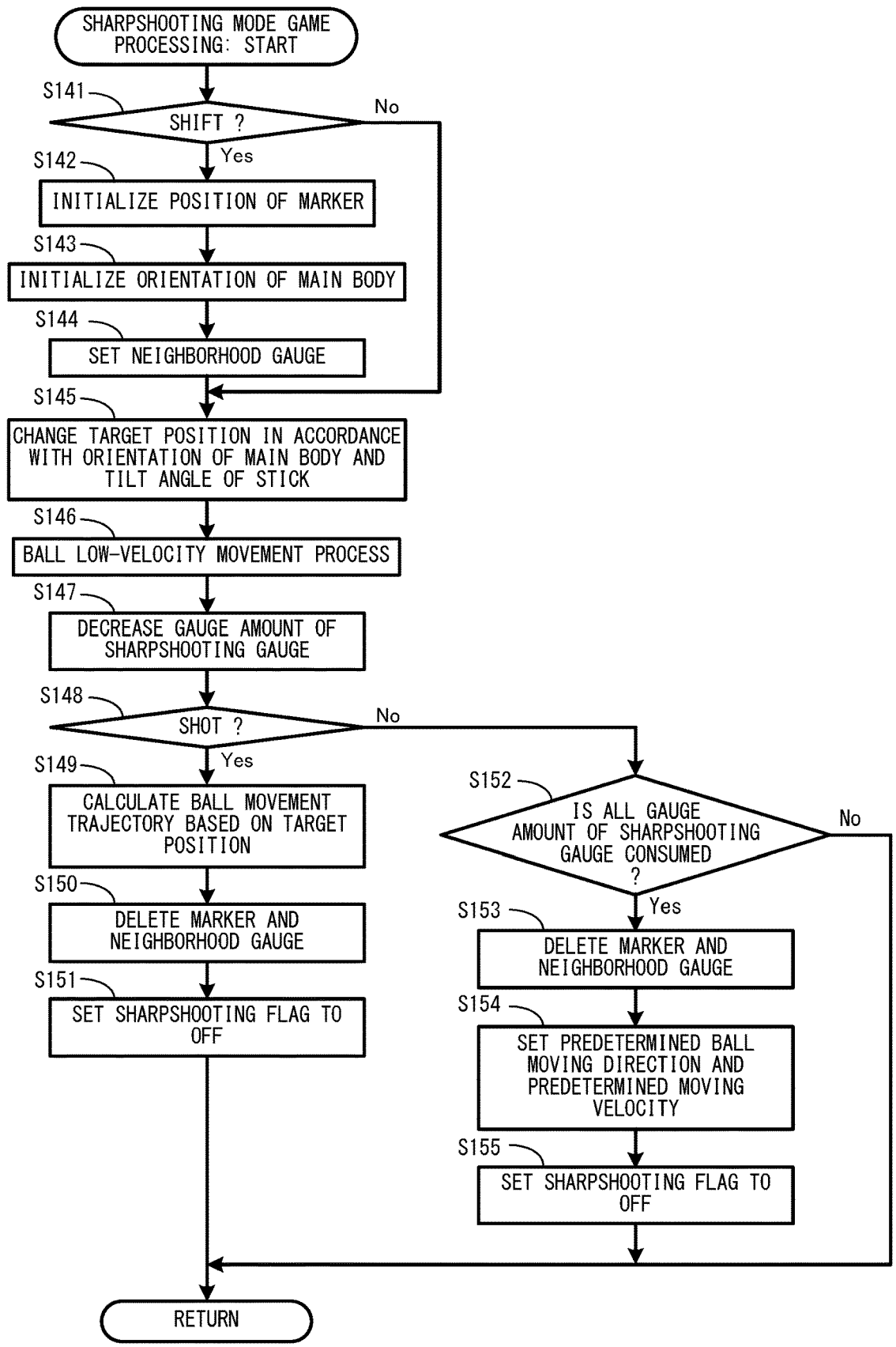
FIG. 19 is a subroutine showing non-limiting examples of the details of sharpshooting mode game processing performed in step S106 in FIG. 17.

Next, with reference to FIGS. 17 to 19, a detailed example of game processing according to the exemplary embodiment is described. FIG. 17 is a flow chart showing an example of game processing executed by the game system 1. FIG. 18 is a subroutine showing examples of the details of normal mode game processing performed in step S105 in FIG. 17. FIG. 19 is a subroutine showing examples of the details of sharpshooting mode game processing performed in step S106 in FIG. 17. In the exemplary embodiment, a series of processes shown in FIGS. 17 to 19 is performed by the processor 81 executing a predetermined application program (a game program) included in the various programs Pa. Further, the information processing shown in FIGS. 17 to 19 is started at any timing.

It should be noted that the processes of all of the steps in the flow charts shown in FIGS. 17 to 19 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 17 to 19 may be executed by the cooperation of a plurality of information processing apparatuses including the main body apparatus 2.

In FIG. 25, the processor 81 performs initialization in the game processing (step S102), and the processing proceeds to the next step. For example, in the initialization, the processor 81 initializes parameters for performing the processing described below, for example, sets the position of each object to an initial position, initializes the position of the marker M to the center of the opponent's court, initializes the gauge amounts of the sharpshooting gauges to 0, and initializes the sharpshooting flag to off, thereby updating each piece of data.

Next, the processor 81 acquires operation data from each of the left controller 3 and/or the right controller 4 and updates the operation data Da (step S103), and the processing proceeds to the next step. It should be noted that by operation data acquisition means, the processor 81 performs the process of acquiring operation data, and as an example, the operation data acquisition means corresponds to the process of step S103.

Next, the processor 81 determines whether or not the operation mode at the current moment is the normal mode (step S104). Then, when the operation mode at the current moment is the normal mode, the processing proceeds to step S105. On the other hand, when the operation mode at the current moment is the sharpshooting mode, the processing proceeds to step S106. For example, with reference to the sharpshooting flag data Dd, when the sharpshooting flag is set to off, the determination by the processor 81 is affirmative in the above step S104. It should be noted that by mode switching means, the processor 81 performs the process of switching the operation mode, and as an example, the mode switching means corresponds to the process of step S104.

In step S105, the processor 81 performs normal mode game processing, and the processing proceeds to step S107. With reference to FIG. 18, a description is given below of the normal mode game processing performed in step S105.

In FIG. 18, the processor 81 determines whether or not the operation data acquired in the above step S103 indicates an instruction to move the player object PO (step S121). Then, when the operation data indicates an instruction to move the player object PO, the processing proceeds to step S122. On the other hand, when the operation data does not indicate an instruction to move the player object PO, the processing proceeds to step S123. For example, when the operation data acquired in the above step S103 indicates a tilt operation on the analog stick 32, the determination by the processor 81 is affirmative in the above step S121.

In step S122, the processor 81 performs the process of moving the player object PO in the virtual space, and the processing proceeds to step S123. For example, the processor 81 moves a position in the virtual space indicated by the player object position data Di, at a moving velocity corresponding to the tilt amount of the analog stick 32 and in a direction on the court F corresponding to the tilt direction of the analog stick 32 indicated by the operation data acquired in the above step S103 and updates the player object position data Di using the moved position. It should be noted that by player object control means, the processor 81 performs the process of controlling the action of the player object PO, and as an example, the player object control means corresponds to the process of step S122.

In step S123, the processor 81 determines whether or not the operation data acquired in the above step S103 indicates an instruction to cause the player object PO to make a shot with the ball. Then, when the operation data indicates an instruction to cause the player object PO to make a shot with the ball, the processing proceeds to step S124. On the other hand, when the operation data does not indicate an instruction to cause the player object PO to make a shot with the ball, the processing proceeds to step S126. For example, when the operation data acquired in the above step S103 indicates a ball shot operation (e.g., a pressing operation on the A-button 53, the B-button 54, the Y-button 56, or the X-button 55), the determination by the processor 81 is affirmative in the above step S123. It should be noted that by player object control means, the processor 81 performs the process of controlling the action of the player object PO, and as an example, the player object control means corresponds to the process of step S123.

In step S124, in accordance with the tilt direction and the tilt angle of the analog stick 32, the processor 81 calculates the ball moving direction, and the processing proceeds to the next step. For example, the processor 81 calculates as the ball moving direction a direction toward the opponent's court corresponding to the left tilt angle or the right tilt angle of the analog stick 32 (see FIG. 10) indicated by the operation data acquired in the above step S103 and updates the ball movement data Db using the ball moving direction. It should be noted that by first movement determination means, the processor 81 performs the process of determining the movement parameter for the moving body object in the first mode (the normal mode), and as an example, the first movement determination means corresponds to the process of step S124.

Next, in accordance with the content of a shot made by a ball shot operation, the processor 81 calculates the ball moving velocity (step S125), and the processing proceeds to step S126. For example, in accordance with the type of the ball shot operation indicated by the operation data acquired in the above step S103 (whether or not any of the A-button 53, the B-button 54, the Y-button 56, and the X-button 55 is subjected to a pressing operation) or the positional relationship between the position of the ball B and the position of the player object PO at the current moment, the processor 81 calculates the ball moving velocity and adds data indicating the ball moving velocity to the ball movement data Db. It should be noted that in the process of the above step S125, in accordance with the type of the ball shot operation, the up-down direction in the ball moving direction set in the above step S124 may be changed. Further, in the process of the above step S125, based on the positional relationship between the position of the ball B and the position of the player object PO at the current moment, the ball moving velocity may be maintained without being changed on the assumption that the player object PO misses the ball, and the ball moving direction set in the above step S124 may also be changed. It should be noted that by first movement determination means, the processor 81 performs the process of determining the movement parameter for the moving body object in the first mode (the normal mode), and as an example, the first movement determination means corresponds to the process of step S125.

In step S126, the processor 81 determines whether or not the gauge amount of the sharpshooting gauge is to be increased. Then, when the gauge amount of the sharpshooting gauge is to be increased, the processing proceeds to step S127. On the other hand, when the gauge amount of the sharpshooting gauge is not to be increased, the processing proceeds to step S128. For example, when the action of the player object PO set in the above steps S121 to 125 corresponds to a condition for increasing the gauge amount of the sharpshooting gauge, i.e., when the gauge amount change condition is satisfied, the determination by the processor 81 is affirmative in the above step S126.

In step S127, in accordance with the action of the player object PO, the processor 81 increases the gauge amount of the sharpshooting gauge, and the processing proceeds to step S128. For example, when the action of the player object PO set in the above steps S121 to 125 corresponds to the action of increasing the gauge amount of the sharpshooting gauge, the processor 81 increases the gauge amount indicated by the sharpshooting gauge data Dc by an increase amount set in accordance with the action and updates the sharpshooting gauge data Dc using the increased gauge amount.

In step S128, the processor 81 determines whether or not a precondition for shifting to the sharpshooting mode is satisfied. Then, when the precondition for shifting to the sharpshooting mode is satisfied, the processing proceeds to step S129. On the other hand, when the precondition for shifting to the sharpshooting mode is not satisfied, the processing proceeds to step S135. For example, when the gauge amount indicated by the sharpshooting gauge data Dc is greater than or equal to a predetermined threshold, and the ball hit back by the opponent object EO corresponds to a chance ball, the processor 81 determines that the precondition for shifting to the sharpshooting mode is satisfied.

In step S129, the processor 81 sets the sharpshooting area on the court of the player object PO, and the processing proceeds to step S130. For example, with reference to the ball movement data Db and the ball position data Dh of the ball hit back by the opponent object EO, the processor 81 calculates a position suitable for the player object PO to hit back the ball on the court and sets the sharpshooting area A having a predetermined range with its center at the calculated position (see FIG. 11). It should be noted that the sharpshooting area A may be set as a predetermined range with its center at the position where the ball hit back by the opponent object EO will bounce on the court.

On the other hand, in step S135, when the sharpshooting area is set on the court of the player object PO, the processor 81 erases the sharpshooting area from the court of the player object PO, and the processing proceeds to step S130.

In step S130, the processor 81 determines whether or not the operation mode is to be switched to the sharpshooting mode. Then, when the operation mode is to be switched to the sharpshooting mode, the processing proceeds to step S131. On the other hand, when the operation mode is not to be switched to the sharpshooting mode, the processing proceeds to step S132. For example, when the player object PO is placed in the sharpshooting area set in the above step S129, and the operation indicated by the operation data acquired in the above step S103 is a switching operation (e.g., a pressing operation on the first R-button 60), the determination by the processor 81 is affirmative in the above step S130. It should be noted that by mode switching means, the processor 81 performs the process of switching the operation mode, and as an example, the mode switching means corresponds to the process of step S130.

In step S131, the processor 81 sets the sharpshooting flag to on, and the processing proceeds to step S132. For example, the processor 81 sets the sharpshooting flag stored in the sharpshooting flag data Dd to on, thereby updating the sharpshooting flag data Dd. It should be noted that by mode switching means, the processor 81 performs the process of switching the operation mode, and as an example, the mode switching means corresponds to the process of step S131.

In step S132, the processor 81 performs a ball movement process, and the processing proceeds to the next step. For example, based on the ball movement data Db, the processor 81 moves the position of the ball B indicated by the ball position data Dh in the virtual space and updates the ball position data Dh using the moved position of the ball B. Further, to change data related to the ball movement indicated by the ball movement data Db (e.g., the ball moving direction or the ball moving velocity) at the current moment based on a predetermined algorithm or in accordance with collision with another object, the processor 81 updates the ball movement data Db using the changed data.

Next, the processor 81 determines whether or not the endurance degree of the racket R used by the player object PO decreases (step S133). Then, when the endurance degree of the racket R decreases, the processing proceeds to step S134. On the other hand, when the endurance degree of the racket R does not decrease, the processing of this subroutine ends. For example, when the ball hit back by the opponent object EO using a sharpshooting shot collides with the racket R of the player object PO, and if a shot satisfying a predetermined hitting back condition (e.g., a shot at a good timing by the player object PO) cannot be made with the ball, the determination by the processor 81 is affirmative in the above step S133.

In step S134, the processor 81 gives predetermined damage to the racket R of the player object PO and performs the process of decreasing the endurance degree, and the processing of this subroutine ends. For example, the processor 81 subtracts a level corresponding to the damage given to the racket R from the endurance degree level indicated by the endurance degree data De and updates the endurance degree data De using the endurance degree level after the subtraction. It should be noted that the level to be subtracted in the above step S134 may be a fixed level, or may be changed in accordance with the type of the shot of the opponent object EO having damaged the racket R, or may be changed in accordance with the quality of the shot by which the player object PO attempts to hit back the ball. It should be noted that by use limit setting means, the processor 81 performs the process of setting the use limit, and as an example, the use limit setting means corresponds to the process of step S134.

Referring back to FIG. 17, when it is determined in the above step S104 that the operation mode at the current moment is the sharpshooting mode, the processor 81 performs sharpshooting mode game processing (step S106), and the processing proceeds to step S107. With reference to FIG. 19, a description is given below of the sharpshooting mode game processing performed in step S106.

In FIG. 19, the processor 81 determines whether or not the operation mode shifts from the normal mode to the sharpshooting mode at the current moment (step S141). Then, when the current moment is the point in time when the operation mode shifts to the sharpshooting mode, the processing proceeds to step S142. On the other hand, when the operation mode has already shifted to the sharpshooting mode at the current moment, the processing proceeds to step S145.

In step S142, the processor 81 initializes the position of the marker M displayed in the sharpshooting mode (see FIG. 13) to the initial position, and the processing proceeds to the next step. For example, the processor 81 sets the central position of the opponent's side of the court F as the initial position of the marker M and updates the marker position data Df using the initial position.

Next, the processor 81 sets the orientation of the main body of the game system 1 when the operation mode shifts to the sharpshooting mode (step S143), and the processing proceeds to the next step. For example, using the orientation of the game system 1 (e.g., three axial directions calculated based on angular velocities about three axes detected by the angular velocity sensor 105) indicated by the operation data acquired in the above step S103, the processor 81 updates the main body orientation data Dn.

Next, the processor 81 sets the neighborhood gauge G3 (see FIG. 13) (step S144), and the processing proceeds to step S145. For example, using the gauge amount indicated by the sharpshooting gauge data Dc, the processor 81 makes a setting so that the neighborhood gauge G3 indicating the same gauge amount as the gauge amount is displayed near the position of the marker M.

In step S145, in accordance with the orientation of the main body of the game system 1 and/or a tilt operation on the analog stick 32, the processor 81 changes the target position indicated by the marker M, and the processing proceeds to the next step. For example, the processor 81 calculates the difference between the orientation of the game system 1 (i.e., the orientation of the main body of the game system 1 when the operation mode shifts to the sharpshooting mode) indicated by the main body orientation data Dn and the orientation of the game system 1 indicated by the operation data acquired in the above step S103, and based on the calculated difference, calculates the target position indicated by the marker M. Further, when the operation data acquired in the above step S103 indicates a tilt operation on the analog stick 32, the processor 81 calculates the moving direction and the moving distance in and at which the target position indicated by the marker M is to be moved in accordance with the tilt operation direction and the tilt operation angle. Then, the processor 81 changes the target position indicated by the marker M calculated using the moving direction and the moving distance and updates the marker position data Df using the changed target position indicated by the marker M. It should be noted that a method for moving the target position indicated by the marker M is any method. For example, a virtual camera may be moved by the same amount as the difference from the orientation of the main body of the game system 1 such that the fixation point of the virtual camera is the target position indicated by the marker M. Then, in accordance with the tilt operation direction and the tilt operation angle, the virtual camera may be further moved such that the fixation point of the virtual camera after the movement is the target position indicated by the marker M.

Next, the processor 81 performs a ball low-velocity movement process (step S146), and the processing proceeds to the next step. For example, based on the ball movement data Db, the processor 81 moves the position of the ball B indicated by the ball position data Dh at a low velocity in the virtual space and updates the ball position data Dh using the moved position of the ball B. Here, the low-velocity movement is used to make the moving velocity of the ball B moving in the virtual space slower than in the normal mode to secure the time for the user to take aim (determine the target position). A moving velocity obtained by making the ball moving velocity based on the ball movement data Db slow at a predetermined rate may be used, or the moving velocity may be set to 0. It should be noted that instead of the process of making the moving velocity of the ball B slow, the lapse of the game time may be made slower than in the normal mode, thereby securing the time for the user to take aim.

Next, the processor 81 decreases the gauge amount of the sharpshooting gauge by a predetermined amount (step S147), and the processing proceeds to the next step. For example, the processor 81 decreases the gauge amount indicated by the sharpshooting gauge data Dc by the predetermined amount and updates the sharpshooting gauge data Dc using the decreased gauge amount. By the process of the above step S147, in the sharpshooting mode, the gauge amount of the sharpshooting gauge decreases in a gradually decreasing manner with the lapse of time.

Next, the processor 81 determines whether or not the operation data acquired in the above step S103 indicates an instruction to cause the player object PO to make a shot with the ball (step S148). Then, when the operation data indicates an instruction to cause the player object PO to make a shot with the ball, the processing proceeds to step S149. On the other hand, when the operation data does not indicate an instruction to cause the player object PO to make a shot with the ball, the processing proceeds to step S152. For example, when the operation data acquired in the above step S103 indicates a ball shot operation (e.g., a pressing operation on the A-button 53, the B-button 54, the Y-button 56, or the X-button 55), the determination by the processor 81 is affirmative in the above step S148. It should be noted that by player object control means, the processor 81 performs the process of controlling the action of the player object PO, and as an example, the player object control means corresponds to the process of step S148.

In step S149, based on the target position, the processor 81 calculates the ball movement trajectory from the current position of the ball B to the target position, and the processing proceeds to the next step. For example, in accordance with the content of the shot of the ball shot operation, the processor 81 calculates the ball movement trajectory from the position of the ball B indicated by the ball position data Db to the target position indicated by the marker position data Df and updates the ball movement data Db using the ball movement trajectory. It should be noted that by second movement determination means, the processor 81 performs the process of determining the movement parameter for the moving body object in the second mode (the sharpshooting mode), and as an example, the second movement determination means corresponds to the process of step S149.

Next, the processor 81 deletes the marker M and the neighborhood gauge G3 (step S150), and the processing proceeds to the next step.

Next, the processor 81 sets the sharpshooting flag to off (step S151), and the processing of this subroutine ends. For example, the processor 81 sets the sharpshooting flag stored in the sharpshooting flag data Dd to off, thereby updating the sharpshooting flag data Dd. It should be noted that by mode switching means, the processor 81 performs the process of switching the operation mode, and as an example, the mode switching means corresponds to the process of step S151.

On the other hand, when it is determined in the above step S148 that the operation data does not indicate an instruction to cause the player object PO to make a shot with the ball, the processor 81 determines whether or not all the gauge amount of the sharpshooting gauge is consumed (step S152). Then, when all the gauge amount of the sharpshooting gauge is consumed, the processing proceeds to step S153. On the other hand, when not all the gauge amount of the sharpshooting gauge is consumed, the processing of this subroutine ends. For example, when the gauge amount indicated by the sharpshooting gauge data Dc is 0, the determination by the processor 81 is affirmative in the above step S152.

In step S153, the processor 81 deletes the marker M and the neighborhood gauge G3, and the processing proceeds to the next step.

Next, the processor 81 sets a predetermined ball moving direction and a predetermined moving velocity (step S154), and the processing proceeds to the next step. For example, the processor 81 determines that the player object PO misses a shot. Then, the processor 81 updates the ball movement data Db using the ball moving direction and the moving velocity set in advance for the missed shot.

Next, the processor 81 sets the sharpshooting flag to off (step S155), and the processing of this subroutine ends. For example, the processor 81 sets the sharpshooting flag stored in the sharpshooting flag data Dd to off, thereby updating the sharpshooting flag data Dd. It should be noted that by mode switching means, the processor 81 performs the process of switching the operation mode, and as an example, the mode switching means corresponds to the process of step S155.

Referring back to FIG. 17, in step S107, the processor 81 performs an action control process on the player object PO, and the processing proceeds to the next step. For example, based on the operation instruction indicated by the operation data acquired in the above step S103, the position or the movement state of the player object PO indicated by the player object position data Di, the position of the ball B indicated by the ball position data Dh, the operation mode at the current moment, and the like, the processor 81 sets the orientation and the action of the player object PO and updates the player object action data Dk using the set orientation and action. It should be noted that by player object control means, the processor 81 performs the process of controlling the action of the player object PO, and as an example, the player object control means corresponds to the process of step S107.

Next, the processor 81 performs an action control process on the opponent object EO (step S108), and the processing proceeds to the next step. As an example, when the action of the opponent object EO is controlled by the processor 81, then based on a predetermined algorithm, the processor 81 causes the opponent object EO to perform an action and updates the opponent object data Dm based on the action. As another example, when the action of the opponent object EO is controlled by another user, then based on an operation of the other user similarly to the player object PO, the processor 81 causes the opponent object EO to perform an action and updates the opponent object data Dm based on the action. It should be noted that by opponent object control means, the processor 81 performs the process of controlling the action of the opponent object, and as an example, the opponent object control means corresponds to the process of step S108.

Next, the processor 81 performs a score process (step S109), and the processing proceeds to the next step. For example, based on the rule of a predetermined sport (e.g., the rule of tennis), the processor 81 determines the score of a competition in the virtual space between the player object PO and the opponent object EO and updates the score data Dg based on the determined score. As an example, when the player object PO fails to hit back the ball from the opponent object EO, the processor 81 adds a point for one play to the score of the opponent object EO. Further, when the ball hits the body of the player object PO, the processor 81 adds a point for one play to the score of the opponent object EO. Then, when the score of the player object PO or the opponent object EO reaches a score for winning the game, the processor 81 determines that the player object PO or the opponent object EO having reached the score wins the competition game. It should be noted that when the endurance degree level of the racket R used by the player object PO becomes 0, the processor 81 may determine that the opponent object EO wins. It should be noted that by winning/losing determination means, the processor 81 performs the process of determining the winning or losing of a competition, and as an example, the winning/losing determination means corresponds to the process of step S109.

Next, the processor 81 performs a display control process for generating a display image and displaying the display image on a display device (e.g., the display 12) (step S110), and the processing proceeds to the next step. For example, using the ball position data Dh, the player object position data Di, the opponent object position data Dj, the player object action data Dk, and the opponent object data Dm, the processor 81 places the tennis court F in the game field and also places the player object PO, the opponent object EO, and the ball B. Then, the processor 81 generates a virtual space image in which the game field is viewed from a virtual camera placed at a predetermined position (e.g., above the player object PO or a position controlled by the marker position data Df). Further, based on the sharpshooting gauge data Dc, the endurance degree data De, the marker position data Df, and the score data Dg, the processor 81 performs the process of, in accordance with the processing results of the above steps S103 to S109, disposing the sharpshooting gauge G1, the sharpshooting gauge G2, the neighborhood gauge G3, the degree-of-endurance gauge G4, the marker M, the game score, the sharpshooting area A, and the like at positions set in the virtual space image and displaying the virtual space image on the display screen of the display device (e.g., the display 12). It should be noted that by image processing means, the processor 81 performs the process of generating an image of the virtual space, and as an example, the image processing means corresponds to the process of step S110.

Next, the processor 81 determines whether or not the game is to be ended (step S111). In the above step S111, examples of a condition for ending the game include: the fact that the result of the game is finalized; and the fact that the user performs the operation of ending the game. When the game is not to be ended, the processing returns to the above step S103, and the process of step S103 is repeated. When the game is to be ended, the processing of the flow chart ends. Hereinafter, the series of processes of steps S103 to S111 are repeatedly executed until it is determined in step S111 that the game is to be ended.

As described above, in the exemplary embodiment, in a shot operation in the sharpshooting mode, it is possible to determine a position in the virtual world as aimed at by the user and achieve unconventional operability. Further, in the sharpshooting mode, the condition for shifting to the sharpshooting mode and the time limit after a shift to the sharpshooting mode are set. Thus, a strategy for using the sharpshooting mode is necessary.

It should be noted that in the above exemplary embodiment, the time in which the sharpshooting mode can be continued is set, thereby providing a limit on the sharpshooting mode. Alternatively, a limit based on another condition may be provided. For example, a limit may be provided on the number of times a shot can be made in the sharpshooting mode. In this case, every time a shot is made using the sharpshooting mode, one time is subtracted from the number of times a shot can be made in the sharpshooting mode.

Further, in the above exemplary embodiment, a game has been used where the winning or losing of a competition in the virtual space between the player object PO and the opponent object EO is determined based on the rule of a predetermined sport. Alternatively, the exemplary embodiment can also be applied to another game. For example, a game may be employed where a player object PO hits a moving body object (e.g., a ball or a bullet) at an opponent object EO as a target, thereby obtaining a point. In this case, a game may be employed where the moving body object collides with the body of the opponent object EO only once, whereby the opponent object EO is defeated, or where the moving body object collides with the body of the opponent object EO, thereby decreasing the physical strength of the opponent object EO by a predetermined amount, and when the physical strength becomes 0, the opponent object EO is defeated. This game can be considered as a game where, when the moving body object collides with the body of the opponent object EO, the opponent object EO is defeated. It should be noted that the predetermined amount by which the physical strength of the opponent object EO decreases due to the fact that the moving body object collides with the body of the opponent object EO may be set to a certain amount, or may be set to a different amount in accordance with a part of the opponent object EO with which the moving body object collides. Further, the exemplary embodiment may be applied to a game where a player object PO and an opponent object EO compete to move a moving body object to a predetermined place.

Further, in the above exemplary embodiment, an example has been used where a sharpshooting shot can be made based on the gauge amount of the sharpshooting gauge. Alternatively, the sharpshooting gauge may also be used for another shot. For example, when the user performs a predetermined operation using as a precondition the fact that the gauge amount of the sharpshooting gauge reaches the maximum amount, the player object PO may become able to make a special shot. In this case, the special shot may be executed, whereby all the sharpshooting gauge of the player object PO may be consumed, and the gauge amount may decrease to 0 in a moment.

Further, in the above exemplary game, an example has been used where play is performed using the unified apparatus obtained by attaching the left controller 3 and the right controller 4 to the main body apparatus 2. Alternatively, play may be performed in the state where the left controller 3 and the right controller 4 are detached from the main body apparatus 2. For example, game play may be performed in the state where a single user holds the left controller 3 with their left hand and holds the right controller 4 with their right hand. Alternatively, game play may be performed by a single user using the left controller 3 and another user using the right controller 4. In these cases, a game image may be displayed on the display 12 of the main body apparatus 2, or a game image may be displayed on a display screen of the stationary monitor by attaching the main body apparatus 2 alone to the cradle.

Further, the game system 1 may communicate with another game system 1, whereby a game may be performed using a plurality of game systems 1. In this case, a game is performed where, using a first game system 1 for operating a player object PO and a second game system 1 for operating an opponent object EO, the winning or losing of a competition in a virtual space between the player object PO and the opponent object EO is determined. Similarly to the player object PO described above, the second game system 1 controls the opponent object EO, whereby it is possible to achieve a similar game.

Further, in the above description, an example has been used where the orientation of the main body of the game system 1 is detected using angular velocities detected by an angular velocity sensor. Alternatively, the orientation of the main body of the game system 1 may be detected using the output of another sensor. For example, the orientation of the main body of the game system 1 may be detected using accelerations detected by an acceleration sensor. In this case, as an example, the direction of gravity is calculated from the accelerations detected by the acceleration sensor, and a change in the direction of gravity is detected, whereby it is possible to detect the orientation of the main body of the game system 1.

Further, in the above exemplary embodiment, game processing is performed by the main body apparatus 2. Alternatively, part or all of the processing may be performed by another apparatus. For example, part or all of the processing may be performed by the left controller 3 and/or the right controller 4.

Further, in another exemplary embodiment, the main body apparatus 2 may be able to directly communicate with the stationary monitor. For example, the main body apparatus 2 and the stationary monitor may be able to directly perform wired communication with each other, or directly perform wireless communication with each other. In this case, based on whether or not the main body apparatus 2 and the stationary monitor can directly communicate with each other, the main body apparatus 2 may determine the display destination of an image.

Further, an additional apparatus (e.g., a cradle) may be any additional apparatus attachable to and detachable from the main body apparatus 2. The additional apparatus may or may not have the function of charging the main body apparatus 2 as in the exemplary embodiment.

Further, the game system 1 may be any apparatus, and may be a mobile game apparatus, any mobile electronic device (a PDA (Personal Digital Assistant), a mobile phone, a personal computer, a camera, a tablet, or the like) or the like.

Further, the above descriptions have been given using an example where the game system 1 performs information processing (game processing) and a communication process. Alternatively, another apparatus may perform at least some of the processing steps. For example, if the game system 1 is further configured to communicate with another apparatus (e.g., another server, another image display device, another game apparatus, or another mobile terminal), the other apparatus may move in conjunction with to perform the processing steps. Another apparatus may thus perform at least some of the processing steps, thereby enabling processing similar to that described above. Further, the above information processing (game processing) can be performed by a processor or the cooperation of a plurality of processors, the processor or the plurality of processors included in an information processing system including at least one information processing apparatus. Further, in the above exemplary embodiment, information processing can be performed by the processor 81 of the game system 1 executing a predetermined program. Alternatively, part or all of the processing of the flow charts may be performed by a dedicated circuit included in the game system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above program may be supplied to the game system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as a game program, a game apparatus, a game system, and a game processing method for, for example, enabling a user to aim at a desired position in a particular mode.

What is claimed is:

1. A non-transitory computer-readable storage medium having stored therein a game program executed by a computer included in an apparatus for performing processing based on a user operation, the game program causing the computer to provide execution comprising:
    acquiring operation data based on the user operation;
    based on data indicating a movement operation for a moving body object in the operation data, causing a player object to perform an action of moving the moving body object in a direction away from the player object in a virtual space;
    switching an operation mode to a first mode or a second mode;
    in the first mode, when the movement operation is performed, then based on at least one of the movement operation and an operation performed together with the movement operation, determining a movement parameter for the moving body object in the virtual space;
    in the second mode, based on data indicating a marker-indicated position movement operation in the operation data, changing a target position of the moving body object indicated by a marker placed so as to indicate a position in the virtual space and determining the movement parameter for the moving body object based on the target position;
    when the movement operation is performed, moving the moving body object based on the movement parameter determined in the first mode or the second mode; and
    generating an image of the virtual space, wherein
    in the acquisition of the operation data, operation data corresponding to at least one of an operation of pressing an operation button, an operation of tilting an operation stick, an operation of pushing in the operation stick, an operation of touching an operation surface, and an operation based on an orientation or a motion of an input device is acquired, and
    based on the acquired operation data, a position of the target position indicated by the marker in the virtual space is changed.

2. The non-transitory computer-readable storage medium having stored therein the game program according to claim 1, wherein
    control is performed to provide a limit on a continuable time in which the second mode can be continued.

3. The non-transitory computer-readable storage medium having stored therein the game program according to claim 1, wherein an action of an opponent object that is placed facing the player object in the virtual space and competes against the player object, is controlled.

4. The non-transitory computer-readable storage medium having stored therein the game program according to claim 1, wherein
    when the moving body object is moved based on the movement parameter determined in the second mode, the moving body object is caused to reach the target position in the virtual space.

5. The non-transitory computer-readable storage medium having stored therein the game program according to claim 1, wherein
    when the moving body object is moved based on the movement parameter determined in the second mode, the moving body object is moved using a moving direction and/or a moving velocity calculated based on the target position in the virtual space.

6. The non-transitory computer-readable storage medium having stored therein the game program according to claim 1, wherein
in switching the operation mode, when a switching operation is performed in the first mode, the operation mode is switched to the second mode.

7. The non-transitory computer-readable storage medium having stored therein the game program according to claim 6, wherein
in switching the operation mode, when the switching operation is performed in a state where the player object is placed within a first range in the virtual space, the operation mode is switched to the second mode.

8. The non-transitory computer-readable storage medium having stored therein the game program according to claim 1, wherein
in switching the operation mode, when the movement operation is performed in the second mode, the operation mode is switched to the first mode.

9. The non-transitory computer-readable storage medium having stored therein the game program according to claim 1, wherein
the marker having a range and indicating a position within the range as the target position.

10. A non-transitory computer-readable storage medium having stored therein a game program executed by a computer included in an apparatus for performing processing based on a user operation, the game program causing the computer to provide execution comprising:
acquiring operation data based on the user operation;
based on data indicating a movement operation for a moving body object in the operation data, causing a player object to perform an action of moving the moving body object in a direction away from the player object in a virtual space;
switching an operation mode to a first mode or a second mode;
in the first mode, when the movement operation is performed, then based on at least one of the movement operation and an operation performed together with the movement operation, determining a movement parameter for the moving body object in the virtual space;
in the second mode, based on data indicating a marker-indicated position movement operation in the operation data, changing a target position of the moving body object indicated by a marker placed so as to indicate a position in the virtual space and determining the movement parameter for the moving body object based on the target position;
when the movement operation is performed, moving the moving body object based on the movement parameter determined in the first mode or the second mode; and
generating an image of the virtual space, wherein
control is performed to provide a limit on a continuable time in which the second mode can be continued, and
when the second mode is continued, the continuable time is decreased in a gradually decreasing manner, and when the continuable time satisfies a switching condition, the operation mode is switched to the first mode.

11. The non-transitory computer-readable storage medium having stored therein the game program according to claim 10, wherein
when a continuable time change condition is satisfied in the first mode, the continuable time is increased.

12. The non-transitory computer-readable storage medium having stored therein the game program according to claim 11, wherein
the continuable time change condition is satisfied when the player object performs a first action in the first mode.

13. A non-transitory computer-readable storage medium having stored therein a game program executed by a computer included in an apparatus for performing processing based on a user operation, the game program causing the computer to provide execution comprising:
acquiring operation data based on the user operation;
based on data indicating a movement operation for a moving body object in the operation data, causing a player object to perform an action of moving the moving body object in a direction away from the player object in a virtual space;
switching an operation mode to a first mode or a second mode;
in the first mode, when the movement operation is performed, then based on at least one of the movement operation and an operation performed together with the movement operation, determining a movement parameter for the moving body object in the virtual space;
in the second mode, based on data indicating a marker-indicated position movement operation in the operation data, changing a target position of the moving body object indicated by a marker placed so as to indicate a position in the virtual space and determining the movement parameter for the moving body object based on the target position;
when the movement operation is performed, moving the moving body object based on the movement parameter determined in the first mode or the second mode; and
generating an image of the virtual space, wherein
control is performed to provide a limit on a continuable time in which the second mode can be continued, and
in generating the image, an image indicating the continuable time set at a current moment is generated, and the image is placed near the marker in the second mode.

14. A non-transitory computer-readable storage medium having stored therein a game program executed by a computer included in an apparatus for performing processing based on a user operation, the game program causing the computer to provide execution comprising:
acquiring operation data based on the user operation;
based on data indicating a movement operation for a moving body object in the operation data, causing a player object to perform an action of moving the moving body object in a direction away from the player object in a virtual space;
switching an operation mode to a first mode or a second mode;
in the first mode, when the movement operation is performed, then based on at least one of the movement operation and an operation performed together with the movement operation, determining a movement parameter for the moving body object in the virtual space;
in the second mode, based on data indicating a marker-indicated position movement operation in the operation data, changing a target position of the moving body object indicated by a marker placed so as to indicate a position in the virtual space and determining the movement parameter for the moving body object based on the target position;
when the movement operation is performed, moving the moving body object based on the movement parameter determined in the first mode or the second mode; and
generating an image of the virtual space, wherein in moving the moving body object, control is performed to represent the movement of the moving body object as slower in the second mode than in the first mode.

15. A non-transitory computer-readable storage medium having stored therein a game program executed by a computer included in an apparatus for performing processing based on a user operation, the game program causing the computer to provide execution comprising:
acquiring operation data based on the user operation;
based on data indicating a movement operation for a moving body object in the operation data, causing a player object to perform an action of moving the moving body object in a direction away from the player object in a virtual space;
switching an operation mode to a first mode or a second mode;
in the first mode, when the movement operation is performed, then based on at least one of the movement operation and an operation performed together with the movement operation, determining a movement parameter for the moving body object in the virtual space;
in the second mode, based on data indicating a marker-indicated position movement operation in the operation data, changing a target position of the moving body object indicated by a marker placed so as to indicate a position in the virtual space and determining the movement parameter for the moving body object based on the target position;
when the movement operation is performed, moving the moving body object based on the movement parameter determined in the first mode or the second mode; and
generating an image of the virtual space, wherein
an action of an opponent object, that is placed facing the player object in the virtual space and competes against the player object, is controlled,
each of the player object and the opponent object moves the moving body object using a body or a piece of equipment of each of the player object and the opponent object, and
the game program further causes the computer to provide execution comprising:
when the moving body object moving based on the movement parameter determined in the second mode, collides with the body or the piece of equipment of the opponent object, changing a use limit parameter for the body or the equipment so as to approach a use limit, and
when the use limit parameter reaches the use limit, prohibiting the body or the piece of equipment of the opponent object from being used.

16. The non-transitory computer-readable storage medium having stored therein the game program according to claim 15, wherein
in setting the use limit, when the moving body object, moving based on the movement parameter determined in the first mode, collides with the body or the piece of equipment of the opponent object, the use limit parameter is changed so as to approach the use limit.

17. The non-transitory computer-readable storage medium having stored therein the game program according to claim 15, wherein
in setting the use limit, the use limit parameter is set at any of a plurality of stages, and
in generating the image, an image indicating a stage of the use limit parameter set at a current moment is generated.

18. The non-transitory computer-readable storage medium having stored therein the game program according to claim 15, the game program further causing the computer to provide execution comprising determining winning or losing of a competition in the virtual space between the player object and the opponent object based on a rule of a sport, wherein
in determining the winning or the losing, when the body or the piece of equipment of the opponent object is prohibited from being used, the opponent object is determined as losing the competition.

19. A non-transitory computer-readable storage medium having stored therein a game program executed by a computer included in an apparatus for performing processing based on a user operation, the game program causing the computer to provide execution comprising:
acquiring operation data based on the user operation;
based on data indicating a movement operation for a moving body object in the operation data, causing a player object to perform an action of moving the moving body object in a direction away from the player object in a virtual space;
switching an operation mode to a first mode or a second mode;
in the first mode, when the movement operation is performed, then based on at least one of the movement operation and an operation performed together with the movement operation, determining a movement parameter for the moving body object in the virtual space;
in the second mode, based on data indicating a marker-indicated position movement operation in the operation data, changing a target position of the moving body object indicated by a marker placed so as to indicate a position in the virtual space and determining the movement parameter for the moving body object based on the target position;
when the movement operation is performed, moving the moving body object based on the movement parameter determined in the first mode or the second mode; and
generating an image of the virtual space, wherein
a range where the target position can be set is set to be greater than a range in the virtual space where the moving body object can move based on the movement parameter determined in the first mode.

20. A game apparatus for performing processing based on a user operation, the game apparatus comprising:
a display device; and
processing circuitry operatively coupled to the display device, the processing circuitry having at least one processor, and the processing circuitry configured to:
acquire operation data based on the user operation;
based on data indicating a movement operation for a moving body object in the operation data, cause a player object to perform an action of moving the moving body object in a direction away from the player object in a virtual space;
switch an operation mode to a first mode or a second mode;
in the first mode, when the movement operation is performed, then based on at least one of the movement operation and an operation performed together with the movement operation, determine a movement parameter for the moving body object in the virtual space;
in the second mode, based on data indicating a marker-indicated position movement operation in the operation data, change a target position of the moving body object indicated by a marker placed so as to indicate a position in the virtual space and determine the movement parameter for the moving body object based on the target position;

when the movement operation is performed, move the moving body object based on the movement parameter determined in the first mode or the second mode; and generate an image of the virtual space, wherein in the acquisition of the operation data, operation data corresponding to at least one of an operation of pressing an operation button, an operation of tilting an operation stick, an operation of pushing in the operation stick, an operation of touching an operation surface, and an operation based on an orientation or a motion of an input device is acquired, and based on the acquired operation data, a position of the target position indicated by the marker in the virtual space is changed.

21. A game system for performing processing based on a user operation, the game system comprising:

a processor; and a memory configured to store computer readable instructions that, when executed by the processor, cause the game system to:

acquire operation data based on the user operation;

based on data indicating a movement operation for a moving body object in the operation data, cause a player object to perform an action of moving the moving body object in a direction away from the player object in a virtual space;

switch an operation mode to a first mode or a second mode;

in the first mode, when the movement operation is performed, then based on at least one of the movement operation and an operation performed together with the movement operation, determine a movement parameter for the moving body object in the virtual space;

in the second mode, based on data indicating a marker-indicated position movement operation in the operation data, change a target position of the moving body object indicated by a marker placed so as to indicate a position in the virtual space and determine the movement parameter for the moving body object based on the target position;

when the movement operation is performed, move the moving body object based on the movement parameter determined in the first mode or the second mode; and generate an image of the virtual space, wherein in the acquisition of the operation data, operation data corresponding to at least one of an operation of pressing an operation button, an operation of tilting an operation stick, an operation of pushing in the operation stick, an operation of touching an operation surface, and an operation based on an orientation or a motion of an input device is acquired, and based on the acquired operation data, a position of the target position indicated by the marker in the virtual space is changed.

22. A game processing method for performing processing based on a user operation, the game processing method comprising:

acquiring operation data based on the user operation;

based on data indicating a movement operation for a moving body object in the operation data, causing a player object to perform an action of moving the moving body object in a direction away from the player object in a virtual space;

switching an operation mode to a first mode or a second mode;

in the first mode, when the movement operation is performed, then based on at least one of the movement operation and an operation performed together with the movement operation, determining a movement parameter for the moving body object in the virtual space;

in the second mode, based on data indicating a marker-indicated position movement operation in the operation data, changing a target position of the moving body object indicated by a marker placed so as to indicate a position in the virtual space and determining the movement parameter for the moving body object based on the target position;

when the movement operation is performed, moving the moving body object based on the movement parameter determined in the first mode or the second mode; and generating an image of the virtual space, wherein in the acquisition of the operation data, operation data corresponding to at least one of an operation of pressing an operation button, an operation of tilting an operation stick, an operation of pushing in the operation stick, an operation of touching an operation surface, and an operation based on an orientation or a motion of an input device is acquired, and based on the acquired operation data, a position of the target position indicated by the marker in the virtual space is changed.

* * * * *